(12) United States Patent
Holt et al.

(10) Patent No.: US 8,330,614 B2
(45) Date of Patent: *Dec. 11, 2012

(54) LOW POWER TELEMETRY SYSTEM AND METHOD

(75) Inventors: Michael D. Holt, Elon, NC (US);
Kenneth B. Tysinger, Burlington, NC (US); J. Lamar Chancey, Burlington, NC (US)

(73) Assignee: General Dynamics Advanced Information Systems, Fairfax, VA (US)

( * ) Notice: Subject to any disclaimer, the term of this patent is extended or adjusted under 35 U.S.C. 154(b) by 418 days.

This patent is subject to a terminal disclaimer.

(21) Appl. No.: 12/585,462

(22) Filed: Sep. 15, 2009

(65) Prior Publication Data

US 2010/0111098 A1     May 6, 2010

Related U.S. Application Data

(63) Continuation of application No. 11/287,144, filed on Nov. 23, 2005, now Pat. No. 7,592,899, which is a continuation-in-part of application No. 10/859,910, filed on Jun. 1, 2004, now Pat. No. 7,970,003.

(51) Int. Cl.
*G05B 11/01* (2006.01)

(52) U.S. Cl. ............... 340/850; 340/12.37; 340/12.32; 379/419; 379/437; 367/136

(58) Field of Classification Search ............. 340/310.11, 340/310.15, 852, 12.32–12.37, 850; 379/419; 367/136
See application file for complete search history.

(56) References Cited

U.S. PATENT DOCUMENTS

| | | | |
|---|---|---|---|
| 5,724,985 A | 3/1998 | Snell et al. | |
| 5,941,906 A | 8/1999 | Barrera et al. | |
| 6,223,074 B1 | 4/2001 | Granger | |
| 6,728,810 B1 | 4/2004 | Ishibashi | |
| 6,792,143 B1 | 9/2004 | Harmovaara | |
| 6,813,220 B2 | 11/2004 | Hicks et al. | |
| 6,934,655 B2 | 8/2005 | Jones et al. | |
| 7,592,899 B2 * | 9/2009 | Holt et al. | 340/12.32 |
| 2002/0019584 A1 | 2/2002 | Schulze | |

* cited by examiner

*Primary Examiner* — Albert Wong
(74) *Attorney, Agent, or Firm* — Ingrassia Fisher & Lorenz, P.C.

(57) ABSTRACT

A telemetry system is described in which a plurality of channels are coupled to a bus. A control subsystem controls the channels so that one of the channels presents to the bus during its designated time period a channel characteristic. The control subsystem interrogates in the analog domain each of the channels during its designated time period, and forms a signal representative of the channel characteristic. The control subsystem may combine one or more of the signals into a digital packet, and transmit the same via transceiver over a wireless network. The channels may be contained within a submersible enclosure and displaced at intervals along the bus, thereby forming an array for monitoring waterborne threats. The array may lie along an ocean floor, may be towed by a marine vehicle, or may suspended from a deployable buoy containing the control subsystem, transceiver, and a remote power source. The array may further comprise a defensive countermeasure deployable responsive to detecting a threat.

12 Claims, 28 Drawing Sheets

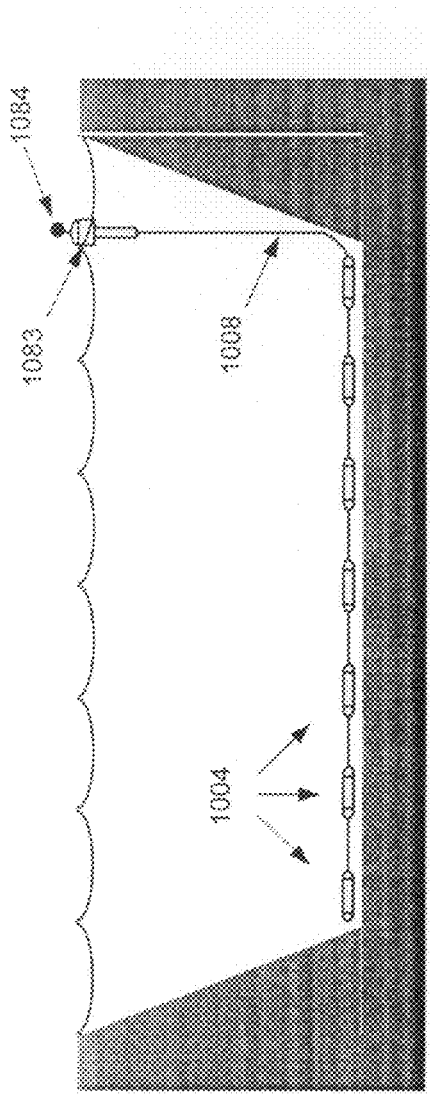
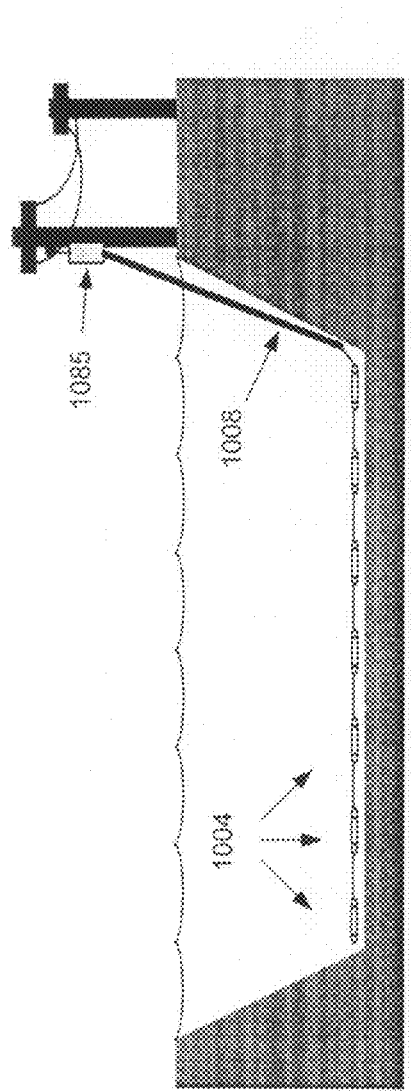
FIG. 10A
FIG. 10B

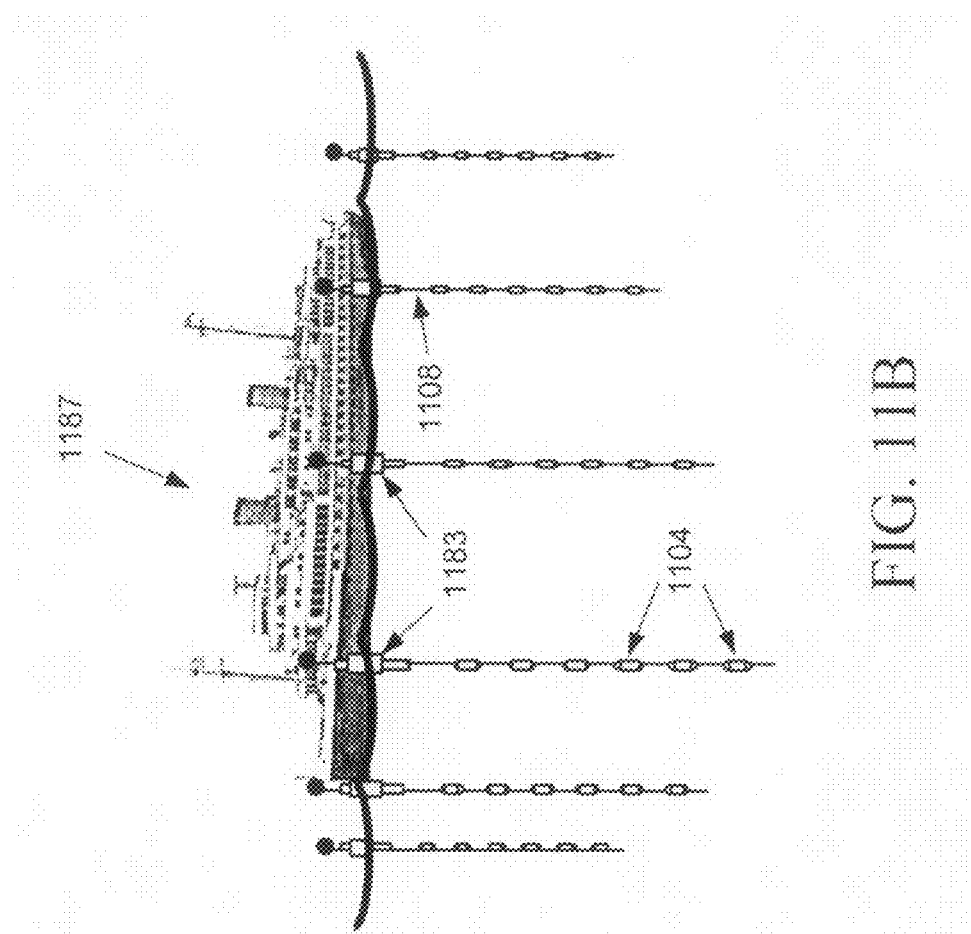
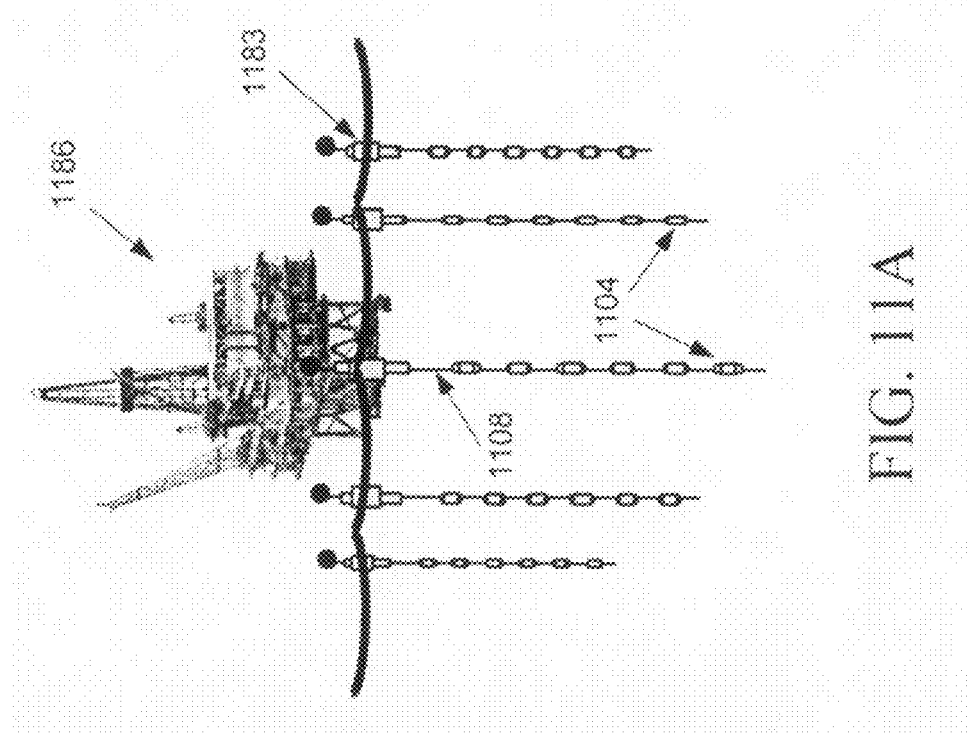
FIG. 11B
FIG. 11A

LOW POWER TELEMETRY SYSTEM AND METHOD

This application is a continuation of U.S. application Ser. No. 11/287,144 filed Nov. 23, 2005 now U.S. Pat. No. 7,592, 899, which is a continuation-in-part of U.S. application Ser. No. 10/859,910 filed Jun. 1, 2004 now U.S. Pat. No. 7,970, 003, which are incorporated herein by reference as though set forth in full.

FIELD OF THE INVENTION

This invention relates to the field of telemetry systems, and, more specifically, to very low power time division multiplexed analog domain telemetry systems. The invention also relates to telemetry systems used in homeland defense applications for monitoring waterborne threats.

RELATED ART

Conventional telemetry systems typically function in the digital domain, and consume excessive power because of the high clock rates incident to the use of digital circuitry, and the infrastructure needed to support digital domain processing. Dissipated power in such systems is ultimately dominated by this digital infrastructure and, as such, cannot be further optimized for very low power applications, such as autonomous underwater surveillance, very large scale fixed systems, multi-line towed array systems, and other multiplexed sensor systems that are required to operate in "power limited" applications.

SUMMARY

In a first aspect of this disclosure, a telemetry system is described. The system comprises a bus and a plurality of channels each coupled to the bus. A control subsystem (1) controls the channels so that each one presents to the bus, during a time period designated for the channel, a channel characteristic representative of a signal sampled by the channel, (2) interrogates in the analog domain each of the channels, during the time period designated for a channel, the characteristic presented by the channel, and (3) forms a signal representative of the characteristic presented by the channel during the designated time period.

In one embodiment, the control subsystem time division multiplexes each of the channels so that each and only one of the channels presents to the bus during the designated time period for the channel within a cycle a channel impedance proportional to a signal amplitude sampled by the channel. During the time periods in the cycle other than the time period designated for the channel, the channel presents an open circuit equivalent impedance to the bus. The control subsystem in this embodiment interrogates each of the channels by presenting to each of the channels during its designated time period an analog pulse over the bus. The channel impedance presented by the channel creates an impedance mismatch, which causes a modulated version of the pulse to be reflected back to a termination device coupled to one end of the bus. The modulation of the reflected pulse is representative of the channel impedance, and thus the amplitude of the signal sampled by the channel. The control subsystem forms a signal representative of the amplitude of the reflected pulse. In one embodiment, the control subsystem forms a packet from one or more of the signals, and then transmits the packet over a network.

In another embodiment, the aforedescribed telemetry system further comprises a plurality of sensing channels, each channel and a corresponding sensor enclosed within a submersible enclosure and displaced at intervals along the bus, thereby forming an array of sensing channels for monitoring waterborne threats along an extended range. The array may comprise a horizontal array positioned along the ocean floor for monitoring harbor areas or restricted navigations zones. Alternatively, the array may be towed by a marine vehicle, or may be suspended as a vertical array from a deployable buoy containing the control subsystem, a remote power source, and wireless transmission means. The transmission means may comprise a transceiver and antenna configured to transmit a data packet representing sensing channel outputs to a host platform. The system may further comprise a defensive countermeasure, such as a mine or torpedo, that may be deployed responsive to the array detecting a threat, or responsive to receiving an external firing signal from the host platform.

Other systems, subsystems or system components, methods, features and advantages of the invention or combinations of the foregoing will be or will become apparent to one with skill in the art upon examination of the following figures and detailed description. It is intended that all such additional systems, methods, features, advantages and combinations be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIGS. 4A-4I comprise a circuit diagram of one implementation example of the channel of FIG. 3, wherein:

FIG. 4A illustrates an input stage to a power conditioning and control signal recovery circuit;

FIG. 4B illustrates a voltage regulation circuit;

FIG. 4C illustrates a voltage-controlled impedance circuit;

FIG. 4D illustrates an output gating circuit;

FIG. 4E illustrates a channel programming port with a plurality of programming inputs;

FIG. 4F illustrates a system synchronization acquisition circuit;

FIG. 4G illustrates a low power sample & hold circuit;

FIG. 4H illustrates a system clock acquisition circuit; and

FIG. 4I illustrates a low power channel control circuit comprising a programmable logic element and interfacing circuitry.

FIG. 10A illustrates one embodiment of a telemetry system according to the invention wherein multiple sensing channels are displaced in a horizontal sensing array.

FIG. 10B illustrates another embodiment of the telemetry system having multiple sensing channels displaced in a horizontal sensing array.

FIG. 11A illustrates one implementation of a vertical sensing array using a telemetry system according to the invention for defending an oil platform.

FIG. 11B illustrates another implementation of the vertical sensing array for defending a moored vessel.

DETAILED DESCRIPTION

As utilized herein, terms such as "about" and "substantially" and "near" are intended to allow some leeway in mathematical exactness to account for tolerances that are acceptable in the trade. Accordingly, any deviations upward or downward from the value modified by the terms "about" or "substantially" or "near" in the range of 1% to 20% or less should be considered to be explicitly within the scope of the stated value.

The term "logic" refers to implementations in hardware, software, or combinations of hardware and software.

The term "packet" means a grouping of digital data and control elements which is switched and transmitted as a composite whole, wherein the data and control elements and possibly error control information are arranged in a specified format. The term "packet" includes a frame.

The term MEMS refers to "micro electro-mechanical system" sensor technology.

The term CBRNE refers to "chemical, biological, radiological, nuclear or explosive" type sensors.

Figure 1A:
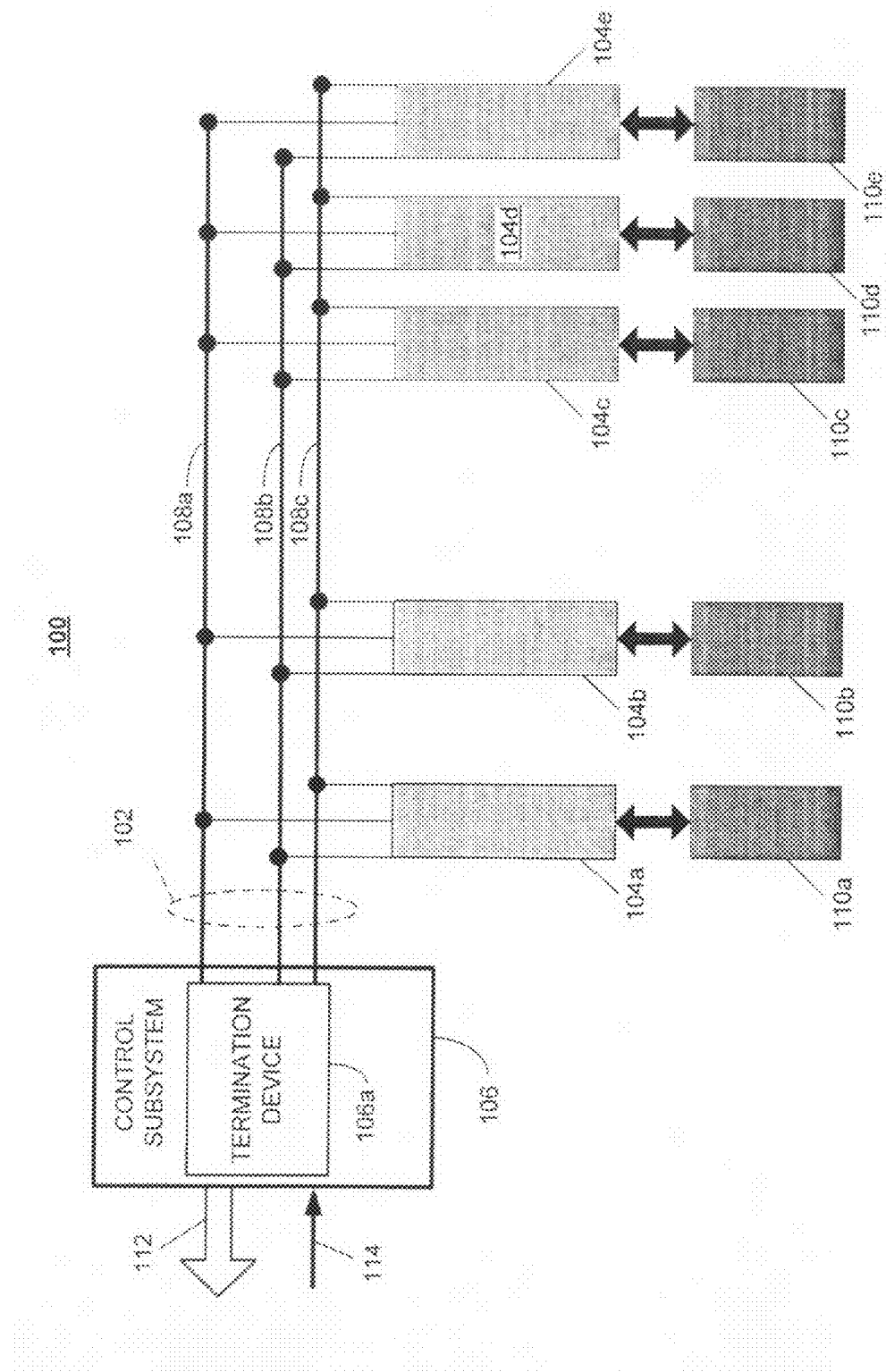
FIG. 1A is a block diagram of one embodiment of a low power telemetry system according to the invention.

FIG. 1A illustrates one embodiment of a telemetry system 100 according to the invention. The system comprises a bus 102, and a plurality of channels 104a, 104b, 104c, 104d, 104e, each coupled to the bus 102. Note that the physical limitation on the number of channels is determined by the combination of the sample rate and the round trip propagation time associated with the strobe-and-probe process (i.e. interrogating channels by transmitting an analog pulse and receiving a partial pulse reflection from an impedance mismatch). Thus, a telemetry system according to the invention is not limited to the number of channels described in this exemplary embodiment. A control subsystem 106, which includes termination device 106a, is configured to (1) control the channels 104a, 104b, 104c, 104d, 104e so that each one presents to the bus 102, during a time period within a cycle designated for the channel, a channel characteristic representative of a signal sampled by the channel, (2) interrogate, during the time period designated for a channel, the characteristic presented by the channel, and (3) form a signal representative of the characteristic presented by the channel during the designated time period.

Each of the channels is assumed to sample (or have previously sampled) a signal provided by a sensor accessible to the channel. In the embodiment of FIG. 1A, for example, channel 104a samples a signal provided by sensor 110a, channel 104b samples a signal provided by sensor 110b, channel 104c samples a signal provided by sensor 110c, channel 104d samples a signal provided by sensor 110d, and channel 104e samples a signal provided by sensor 110e. Since it is contemplated that any type of sensor may be used in the system, these sensors are not considered part of the system 100 as broadly described.

In one embodiment, the control subsystem 106 time division multiplexes the channels so that each and only one channel presents to the bus a characteristic of the channel during a time period designated for the channel within a cycle.

The channel characteristic presented by the channel during its designated time period may be any measurable parameter such as a channel voltage, current, or a channel impedance representative of the amplitude of the signal sampled by the channel. In one embodiment, where the measured parameter is an impedance, control subsystem 106 may control each of the channels to present to bus 102 an open circuit equivalent output impedance during time periods in the cycle other than the time period designated for the channel. Control subsystem 106 may synchronize the channels so that each one samples the amplitude of the output of its corresponding sensor at about the same time.

Bus 102 may comprise one or more signal lines. In the embodiment of FIG. 1A, bus 102 comprises three signal lines 108a, 108b, 108c, but it should be appreciated that examples are possible where more or less than three signal lines are included in the bus. For example, the embodiment shown in FIG. 1B includes a bus 102 having four signal lines 108a, 108b, 108c, and 108d.

Figure 1B:
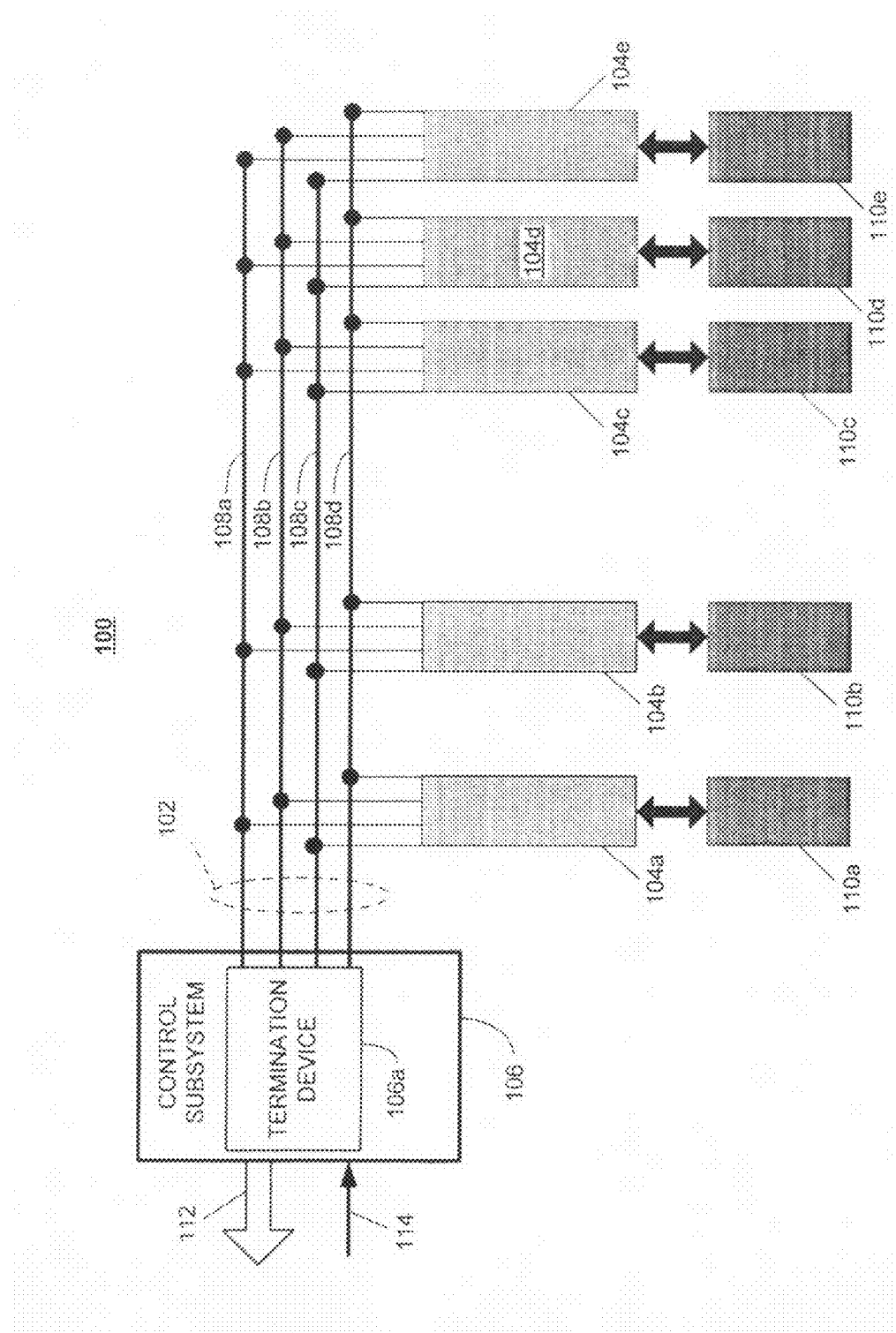
FIG. 1B is a block diagram of another embodiment of a low power telemetry system according to the invention.

Control subsystem 106 may control and provide power to each of the channels through the same one or more signal lines in the bus. In the embodiment of FIG. 1A, for example, control subsystem 106 may control and provide power to each of the channels through a differential signal transmitted over signal lines 108b and 108c which lines may be implemented, e.g. as a twisted pair or as a coaxial cable. In the embodiment of FIG. 1B, control subsystem 106 may provide power to each of the channels over any two signal lines, such as 108b and 108c, while a dedicated signal line, such as 108d, may be used exclusively to transmit control signals to the channels.

In one example, where a pair of signal lines carries a differential signal that provides power and control, the differential signal has first and second states. In the first state, the differential signal provides power to the channels. In the second state, the differential signal performs a control function at one or more of the channels. A power storage element (such as a capacitor) at each channel provides power to the channel when the differential signal is in the second state.

A control subsystem 106 may comprise a termination device 106a at one end of bus 102, and a distributed control element (not shown) at each of the channels. The distributed control element in a channel may identify the time period designated for the channel within a cycle.

In one example, the termination device clocks each of the distributed control elements through a clocking signal sent over bus 102. In this example, each of the distributed control elements includes a timing element (such as a counter), which is updated responsive to the clocking signal. The distributed control element may then identify the time period designated for the channel based on a comparison of the contents of the timing element with a predetermined value for the channel.

The distributed control elements may be programmable with the predetermined value for the channel. In one example, each of the distributed control elements is remotely programmable with the predetermined value for the channel.

In one implementation, the distributed control element for one or more of the channels is implemented as a field programmable gate array (FPGA). Alternatively or in addition, the distributed control element for one or more of the channels is implemented as a complex programmable logic device (CPLD). In one example, the CPLD is a CMOS CPLD. The CMOS CPLD may have a power consumption that varies directly with its clocking rate. In one example, the CMOS CPLD has about zero power consumption at about a zero clocking rate.

In one embodiment, each channel includes a voltage controlled impedance circuit for presenting to bus 102 during the designated time period for the channel an impedance representative of the signal amplitude sampled by the channel. Control subsystem 106 may control this circuit so that an open circuit equivalent output impedance is presented to bus 102 during time periods in the cycle other than the time period designated for the channel.

The impedance presented by a channel to bus 102 during the designated time period may give rise to an impedance mismatch condition at the channel. Control subsystem 106 may interrogate a channel during its designated time period by transmitting from termination device 106a an analog pulse over bus 102. The impedance mismatch at the channel may cause at least a partial reflection of the pulse to return to termination device 106a, with the amplitude of the reflected pulse being representative of the impedance presented by the channel.

Control subsystem 106 may perform at least partial equalization of the transmitted pulses to compensate for variable attenuation caused by different distances between termination device 106a and each of the channels. In the embodiment of FIG. 1A, for example, the interrogation pulse sent to channel 104e may experience greater attenuation than that sent to channel 104a since the distance between the termination device 106A and the channel 104e exceeds that for channel 104a. This is particularly true for configurations having very long cable arrays, for example, 1000 m or more. Accordingly, control subsystem 106 may perform equalization on the two pulses used to interrogate these channels so that the pulses will have about the same amplitude at the time they are received at their respective channels.

Control subsystem 106 may also comprise a linearization circuit to correct any nonlinearities introduced in the reflected signal by the voltage controlled impedance circuit. In one embodiment, these nonlinearities may be corrected by post-linearization of the reflected signal using a processor (not shown) in control subsystem 106. For example, a digital value of a reflected signal may be read by means of the processor, and mapped into a lookup table to retrieve a corrected value.

Termination device 106a may be configured to combine the signals representative of the characteristic presented by one or more of the channels into a packet, and then transmit the packet over a network. In the embodiments illustrated in FIGS. 1A and 1B, for example, the packet may be transmitted to the network over one or more egress lines 112, which may be wireline or wireless links. In one example, the one or more egress lines 112 are wireline modem connections. Termination device 106a may also comprise a trunk interface or a network interface. In one example, the termination device is a backbone network interface. In another example, it comprises an ethernet interface. In a third example, it comprises an Internet interface.

Termination device 106a may be configured to process the one or more signals using a procedure that may be programmed into termination device 106a. In one example, the procedure is remotely programmed into termination device 106a. In the embodiments illustrated in FIG. 1A or 1B, for example, the procedure may be programmed into termination device 106a over one or more ingress lines 114, which again may be wireline or wireless links. In one example, the one or more ingress lines 114 are wireline modem connections. These one or more ingress lines 114 may also provide a mechanism for remotely programming the control element in the termination device to allow dynamic selection of preprogrammed sensor modes. These specific channel selection or sample rate modes are contained in the distributed control elements located at each of the channels. These mode values may be provided to the ingress lines 114, and then routed over bus 102 to the individual distributed control elements.

The procedure may comprise a transformation (such as a Fourier transform) applied to one or more of the signals. The procedure may also comprise a feature extraction procedure. In one example, the procedure combines one or more of the signals into a beam. The procedure may also comprise a search procedure. In one example, the procedure comprises a predetermined mode of operation, such as a test mode, or another mode that continuously samples a selected channel while the other channels remain unsampled. In another example, the procedure comprises a schedule for interrogating more than one of the channels, or all of the channels. A skilled artisan will appreciate that many different modes and sequences may be realized by programming a sampling procedure into a termination device 106a.

Figure 2:
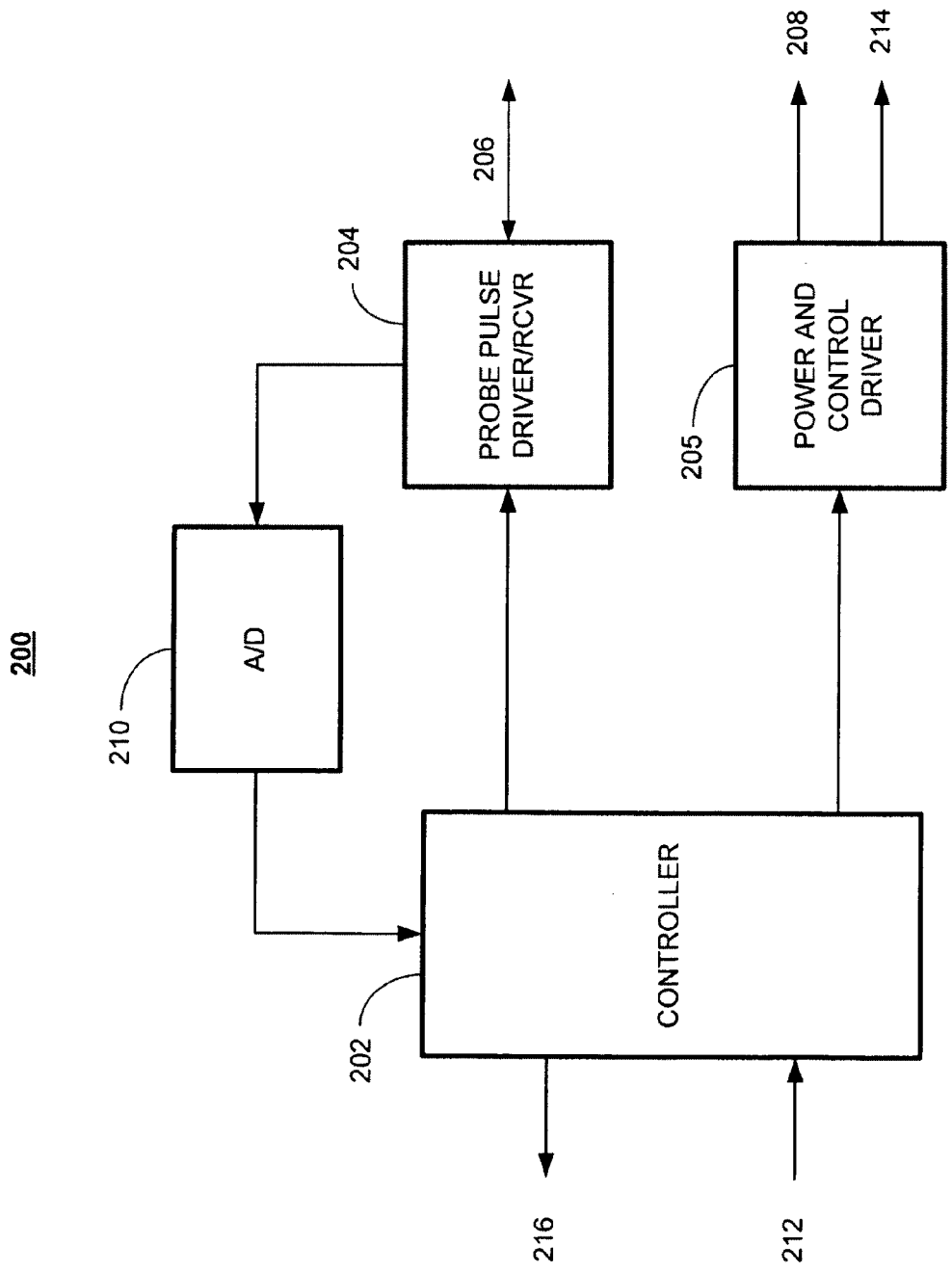
FIG. 2 is a block diagram of one embodiment of a termination device in the system of FIG. 1A or 1B.

FIG. 2 is a block diagram illustrating one embodiment 200 of the termination element. In this embodiment, the termination element comprises a controller 202 coupled to a probe pulse driver/receiver 204 and a power & control driver 205. One or more bidirectional pulse probe signal lines 206 extend from the probe pulse driver/receiver 204. One or more unidirectional differential power & control signal lines 208 extend from the power & control driver 205. In addition, one or more unidirectional programming lines 214, such as JTAG compliant programming lines, extend from the power & control driver 205.

The receiver side of the probe pulse driver/receiver 204 is coupled to A/D converter 210. The output of the A/D converter 210 is coupled to the controller 202. One or more JTAG compliant programming lines 212 form an input to the controller 202. In addition, one or more signal lines 216 for outputting digital packet information forms an output of the controller 202.

The one or more pulse probe signal lines 206, and the one or more power & control signal lines 208 together comprise one embodiment of the bus 102 previously described in relation to system 100.

The controller 202, through suitable signals sent and received by the probe pulse driver/receiver 204 over the one or more signal lines 206, interrogates the channels in the analog domain. Similarly, the controller 202, through suitable signals sent by the power & control driver 205 over the one or more signal lines 208, provides power to and controls the one or more channels in the previously described manner. In addition, the controller 202, through the one or more signal lines 214, programs the distributed control elements in each of the channels in the previously described manner.

The signals received from the channels during the interrogation process are routed to the A/D converter 210, which converts them to digital values. The controller 202 combines one or more of the digital values into a packet, and routes the packets to a network over one or more signal lines 216.

In one implementation example, controller 202 may comprise a single chip 8051 type microcontroller, probe pulse driver/receiver 204 may comprise a series of low resistance CMOS switches to form a differential line driver, power and control driver 205 may be implemented via a single pole double throw CMOS switch that toggles between the two states of the control circuit, and A/D circuit 210 may comprise an Analog Devices AD7677 A/D converter selected for its low power and high speed. In this example, controller 202 clocks the system at about 25-50 kHz, which is much lower than the MHz clock rate typically used to clock digital systems. The combination of the lowered clock rate, the time division multiplexing of the channels, the analog domain probing of the channels (which avoids the need to clock the data out at a high rate), and the use of a zero power CPLD (to be discussed), enables the telemetry segment of a subsystem deploying this technique to achieve a reduced power consumption compared to digital systems in the 5 milliwatt per channel range.

Figure 3:
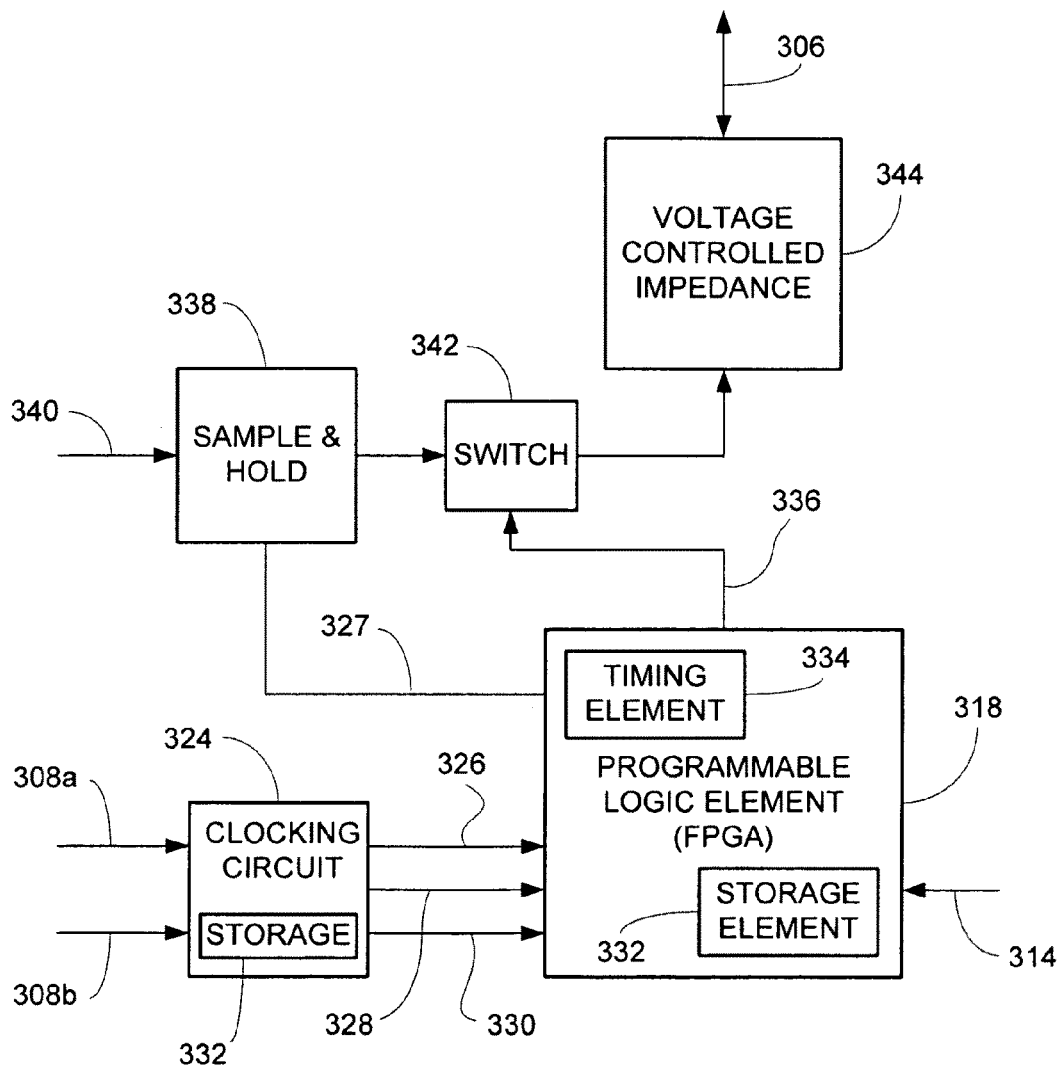
FIG. 3 is a block diagram of one embodiment of a channel in the system of FIG. 1A or 1B.

FIG. 3 is a block diagram of one embodiment of a channel 300 according to the invention. In this embodiment, it is assumed that the one or more probe pulse signal lines 206 form a twisted pair for the transmission and reception of a differential mode probe pulse 306. It is also assumed that the one or more power & control signal lines 208 likewise form a twisted pair for the transmission of a differential mode power & control signal 308.

In this embodiment, channel 300 comprises a programmable logic element 318, such as a field-programmable gate array (FPGA). FPGA 318 in turn comprises a timing element 320 and a storage element 322 for holding a unique channel value in memory, which may be remotely programmed into channel 300.

A clocking circuit 324 receives differential power & control signal 308, and, in response, forms separate sync, strobe and power signals 326, 328, and 330, provided over separate sync, strobe, and power signal lines, respectively. A power storage element 332 is also provided as part of the clocking circuit 324. When differential power & control signal 308 is in a first state, it provides power to FPGA 318 over signal line 330. It also provides power to storage element 332, which stores the power. When differential power & control signal 308 is in a second state, it provides either sync signal 326 or strobe signal 328 to FPGA 318 over, respectively, the sync and strobe signal lines. During this time, power storage element 332 provides power to FPGA 318, and also to support circuitry within the telemetry electronics of channel 300.

The FPGA 318 includes a storage element 332, which holds a unique channel value previously programmed into FPGA 318 over one or more JTAG compliant signal lines 314. In addition, FPGA 318 includes a timing element 334, which, in response to strobe signal 328, either counts up or down depending on the specific implementation. The contents of timing element 334 are compared with the channel value held by storage element 332. When the two are equal, FPGA 318 asserts a signal on signal line 336. Otherwise, signal line 336 remains unasserted.

A sample & hold circuit 338 is also provided. This circuit receives a sensor input 340. When sync signal 326 is asserted, FPGA 318, responsive to signal 326, sends a control signal 327 to sample & hold circuit 338. Upon receiving control signal 327, sample & hold circuit 338 samples the amplitude of sensor input 340, and then holds the sampled value. This functional element allows the sensor output to be captured during a system quiet period (the bus power is off during this sampling period) as well as allows simultaneous capture of sensors where skew in samples will violate the processing requirements.

When signal 336 is asserted, a switch 342 is activated, allowing the sampled value held by sample & hold circuit 338 to be received by a voltage controller impedance circuit 344. In response, voltage controller resistor circuit 344 presents an impedance to the twisted pair carrying signal pulse 306 which is representative of the sampled amplitude held by the sample & hold circuit 338.

When signal 336 is not asserted, voltage controlled resistor circuit 344 presents an open circuit equivalent impedance to the twisted pair carrying pulse 306. In addition, switch 342 is opened, thus decoupling sample & hold circuit 338 from voltage controller resistor circuit 344.

When a differential probe pulse 306 is received over the twisted pair, if the voltage controlled impedance circuit 344 is presenting an open circuit equivalent impedance to the twisted pair, pulse 306 terminates in the channel, and is not reflected. The decoupling provided by switch 342 also helps eliminate the introduction of noise and channel cross-talk into the telemetry electronics of channel 300.

However, when a differential probe pulse 306 is received over the twisted pair, and voltage controlled resistor circuit 344 is presenting an impedance to the twisted pair that is representative of the sampled amplitude held by the sample & hold circuit 338, an impedance mismatch is created at the channel. Accordingly, an amplitude-modulated version of probe pulse 306 is reflected back over the twisted pair, with the degree of amplitude modulation representing the impedance presented by the channel (and hence the sampled amplitude held by sample & hold circuit 338). The reflected pulse is thus sent back to termination device 200.

FIGS. 4A through 4I illustrate one implementation example of a channel according to the invention. These figures make up a single circuit diagram for electronics that comprise a channel such as channel 300 shown in FIG. 3. Interconnections between figures are represented by an upper case letter within a circle; for example, the encircled "A" in the upper right corner of FIG. 4A defines a direct electrical connection to the encircled "A" in the lower right corner of FIG. 4I. Typical values for various electronic components comprising the circuit are as shown in the figures. However, these values are exemplary only, and should not be thought of in any limiting sense. Skilled artisans will recognize that many other component values and/or combinations of components may be used to achieve the same or similar results.

Figure 4A:
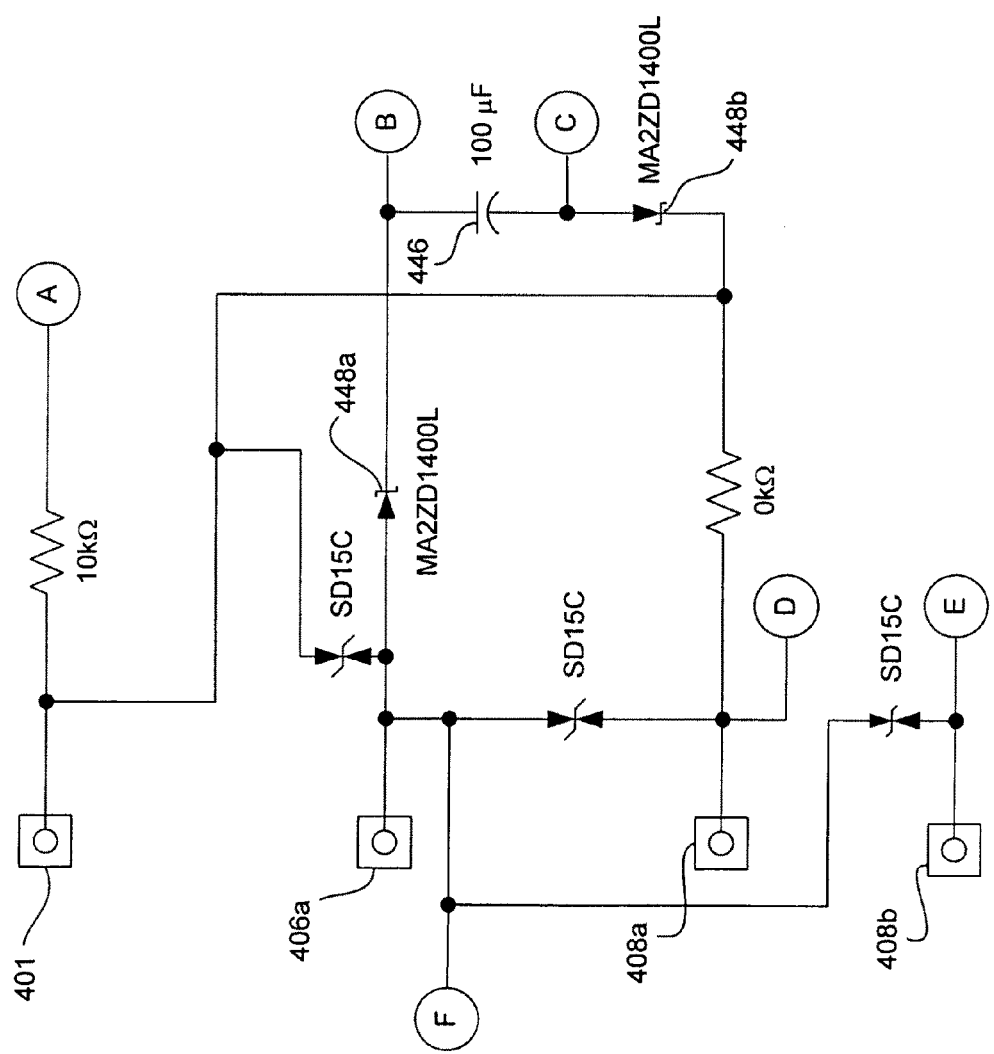
Figure 4B:
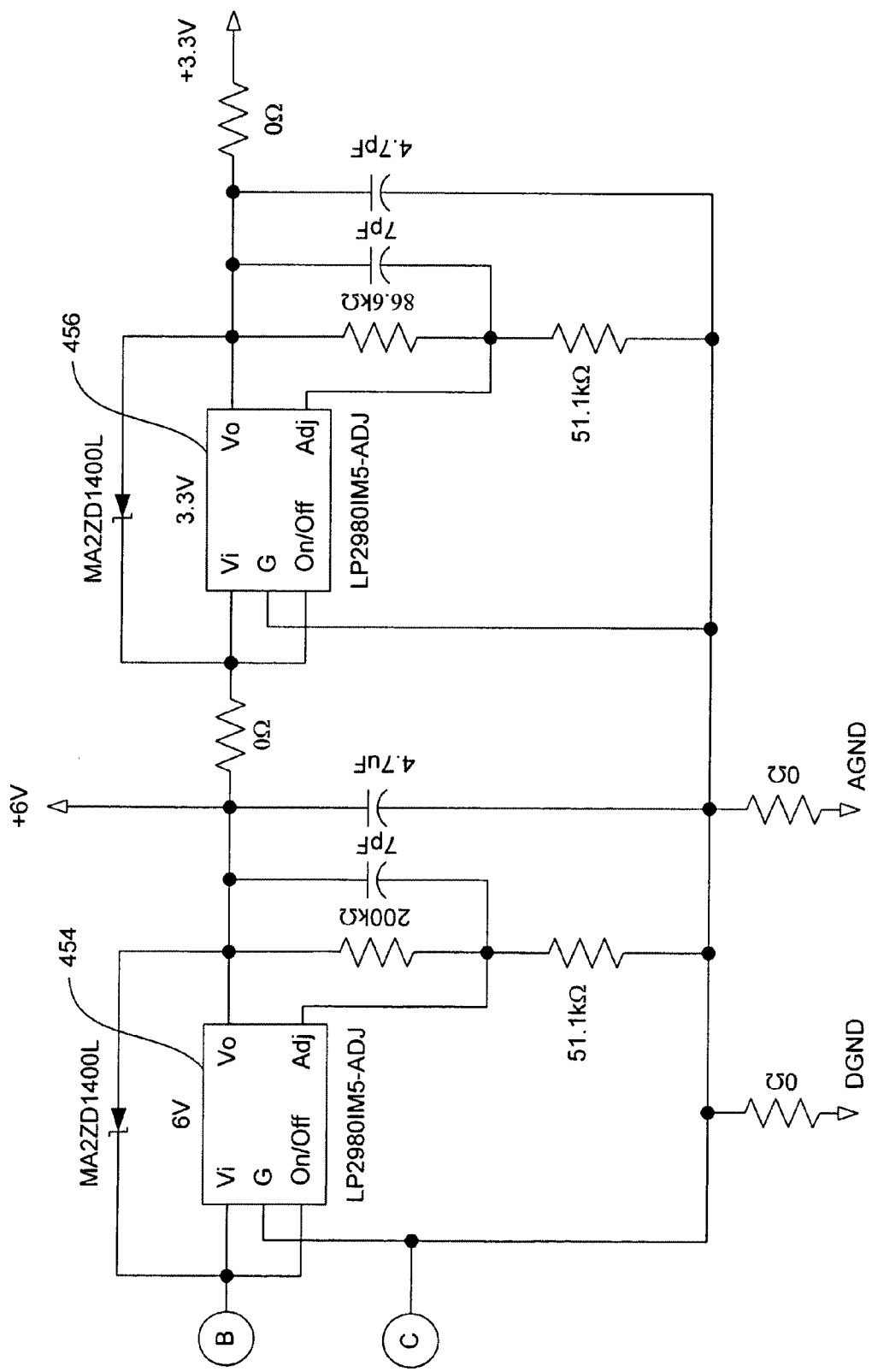
Figure 4C:
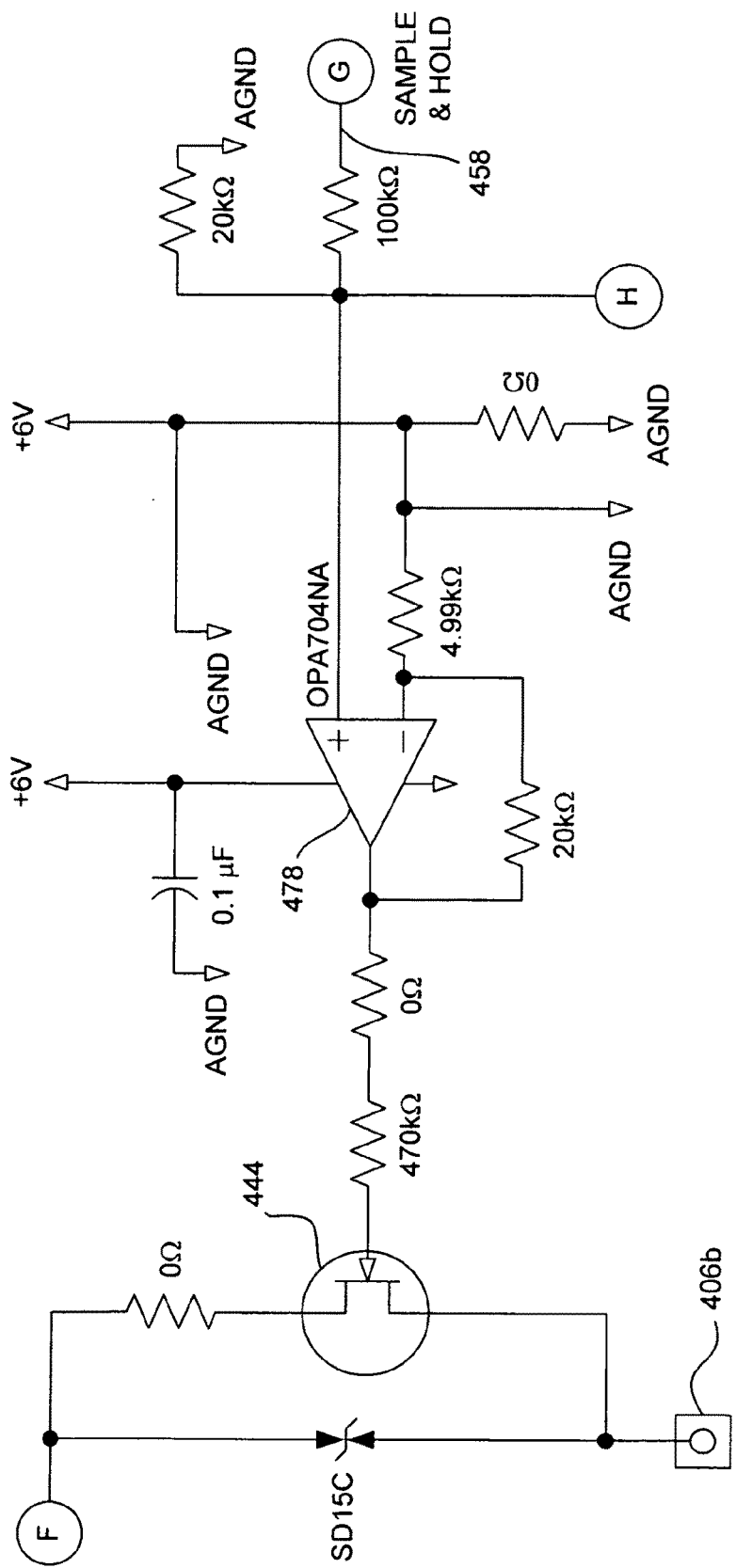

FIG. 4A shows the input stage to the power & control input conditioning circuit that is represented by block 324 in FIG. 3. A signal received over input line 401 sets one of a plurality of programming modes. Input line 406a functions as a system ground. Input line 406b, shown on the voltage controlled impedance circuit of FIG. 4C, provides a source for an interrogation pulse, corresponding to input 306. Input line 408a provides a "sync" input, which is a combination of power and signaling corresponding to input 308a of FIG. 3. Input line 408b provides a "strobe" input corresponding to input 308b. Signals 408a and 408b may originate from a power & control driver circuit such as block 205 shown in FIG. 2. Power regulation for the power & control input conditioning circuit is provided by 6V regulator 454 and 3.3 V regulator 456, shown in FIG. 4B. Regulators 454 and 456 may be conventional voltage regulators, for example, National Semiconductor adjustable type LP2980 or other low dropout equivalent. Additional configurations of this power circuit may eliminate the need for the 6 volt supply in as much as the true telemetry system is able to run strictly on a 3.3 volt supply.

Signal lines 406a, 406b, 408a and 408b may form a twisted quad in this particular example, with signal lines 406a and 406b forming a twisted pair within this quad, and with signal lines 408a and 408b forming a second twisted pair within this quad. Implementations utilizing differential mode signals transmitted over twisted pairs enable extended length busses, i.e., up to 500 meters or more, as well as enhanced reliability and low cost compared to single-ended or coax implementations.

Probe pulse signal lines 406a and 406b deliver a differential mode probe pulse to the channel, as well as return a modulated differential mode reflected probe pulse to the termination end. Power & control signal lines 408a and 408b deliver a differential mode power & control signal that has one of two states. In the first state, it provides power to the channel, and also power to charge capacitor 446. In the second state, it provides either a sync or strobe signal to the channel, and capacitor 446 provides power to the channel. Diodes 448a and 448b prevent leakage from capacitor 446 when it is providing power to the channel. Thus, capacitor 446, in combination with diodes 448a and 448b, functions as an uninterruptible power supply, preventing any power perturbations in the system when signal lines 408a and 408b are in the second state. In this example embodiment, diodes 448a and 448b may be Panasonic type MA2ZD1400L or equivalent.

Figure 4D:
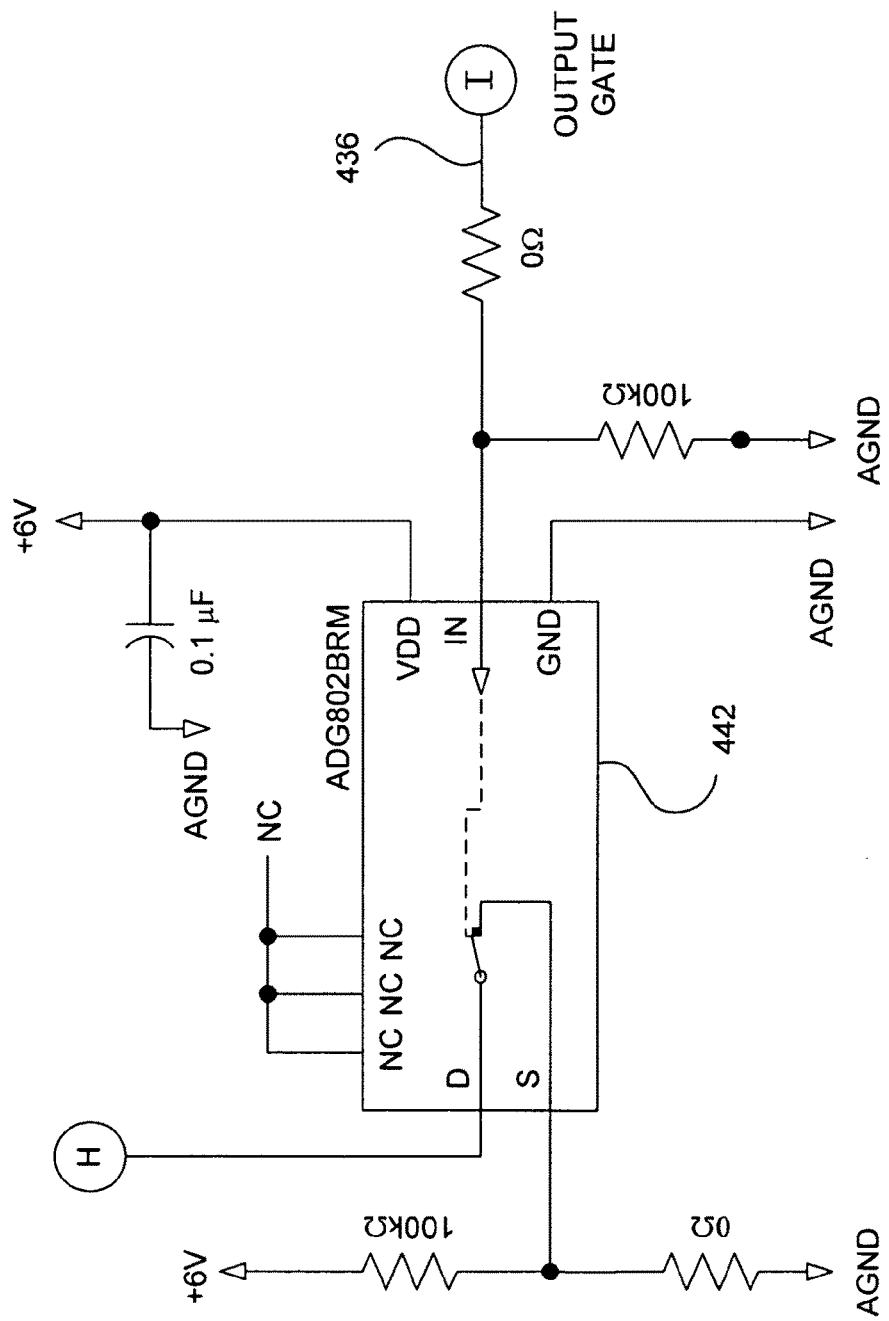
Figure 4E:
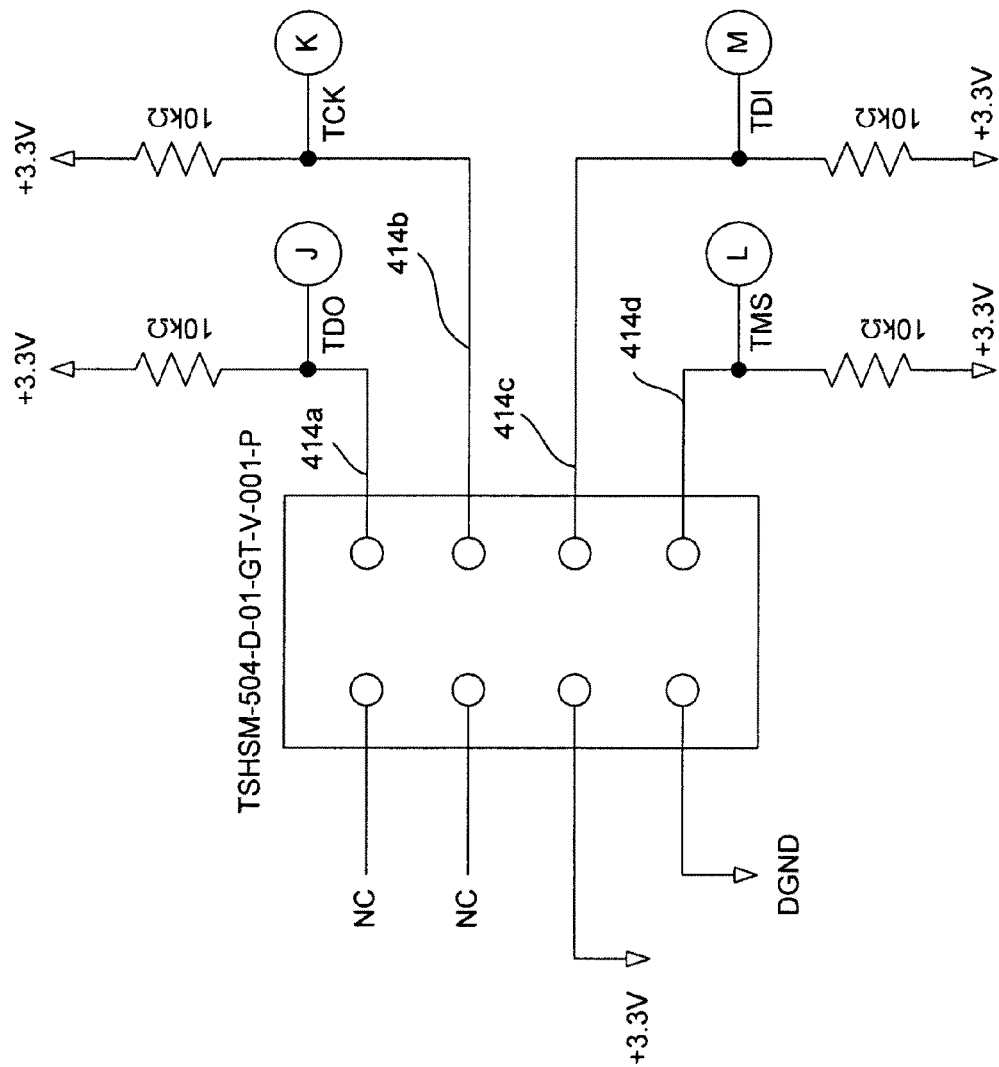
Figure 4F:
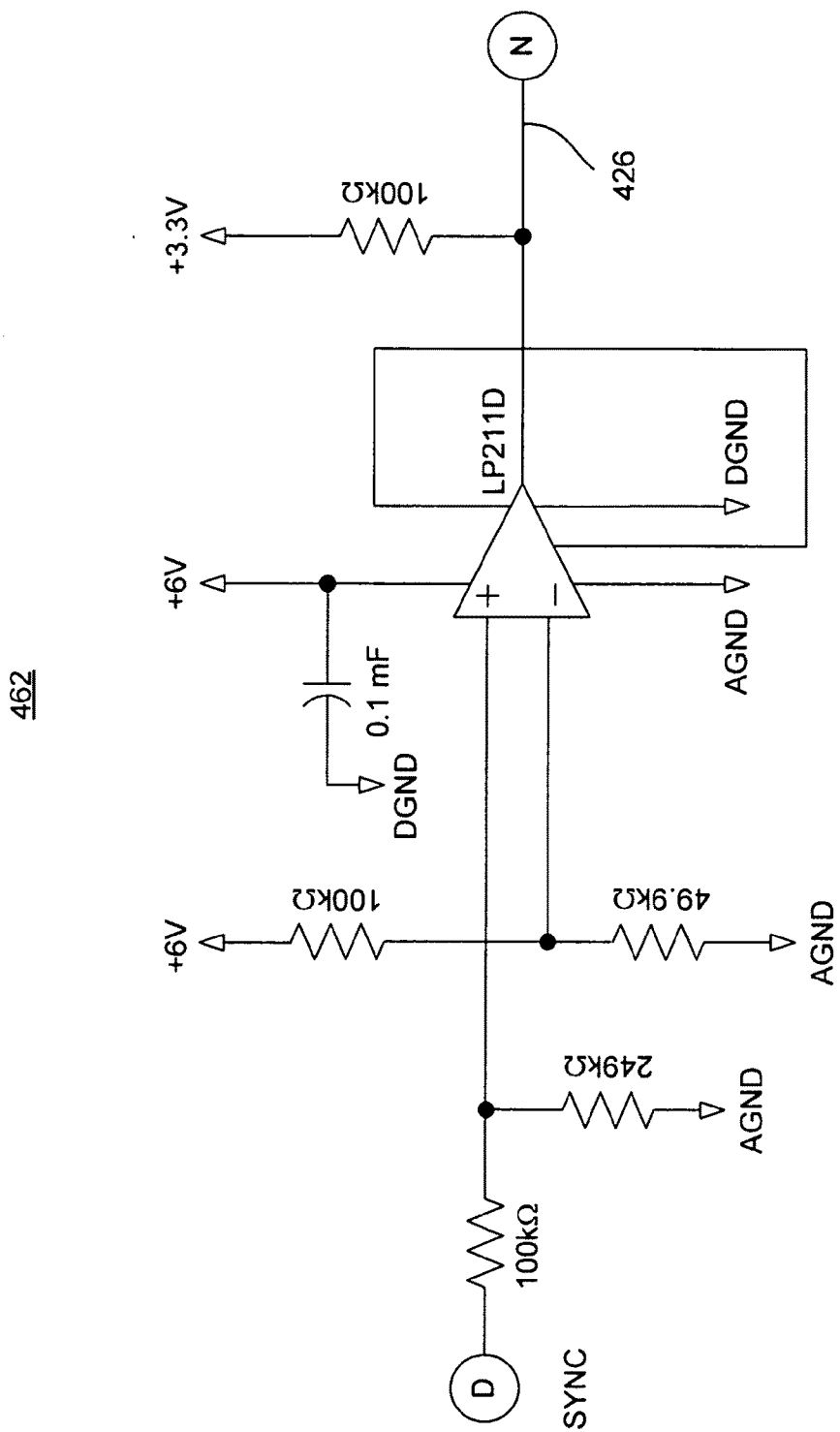

The input on signal line 408a (sync) and the input on signal line 408b (strobe) are each fed to a comparator circuit to determine if a sync or strobe signal is being received over these signal lines. FIG. 4F shows the sync input to a system synchronization acquisition circuit 462. FIG. 4H shows the strobe input to a system clock acquisition circuit 463. The strobe input corresponds to the optional fourth signal line 108d shown in the alternative embodiment of FIG. 1B, and also to input 308b shown in FIG. 3.

Figure 4G:
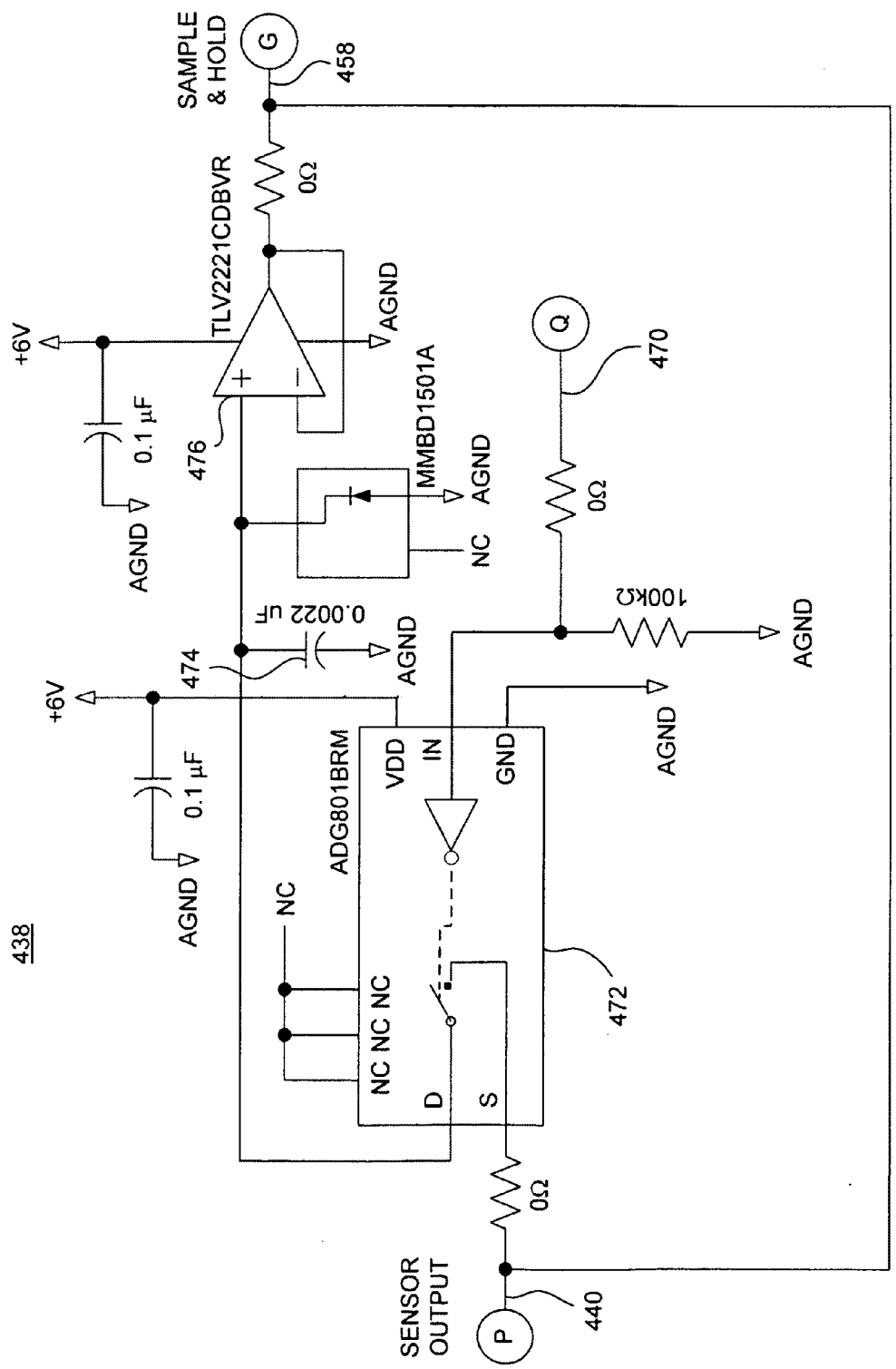
Figure 4H:
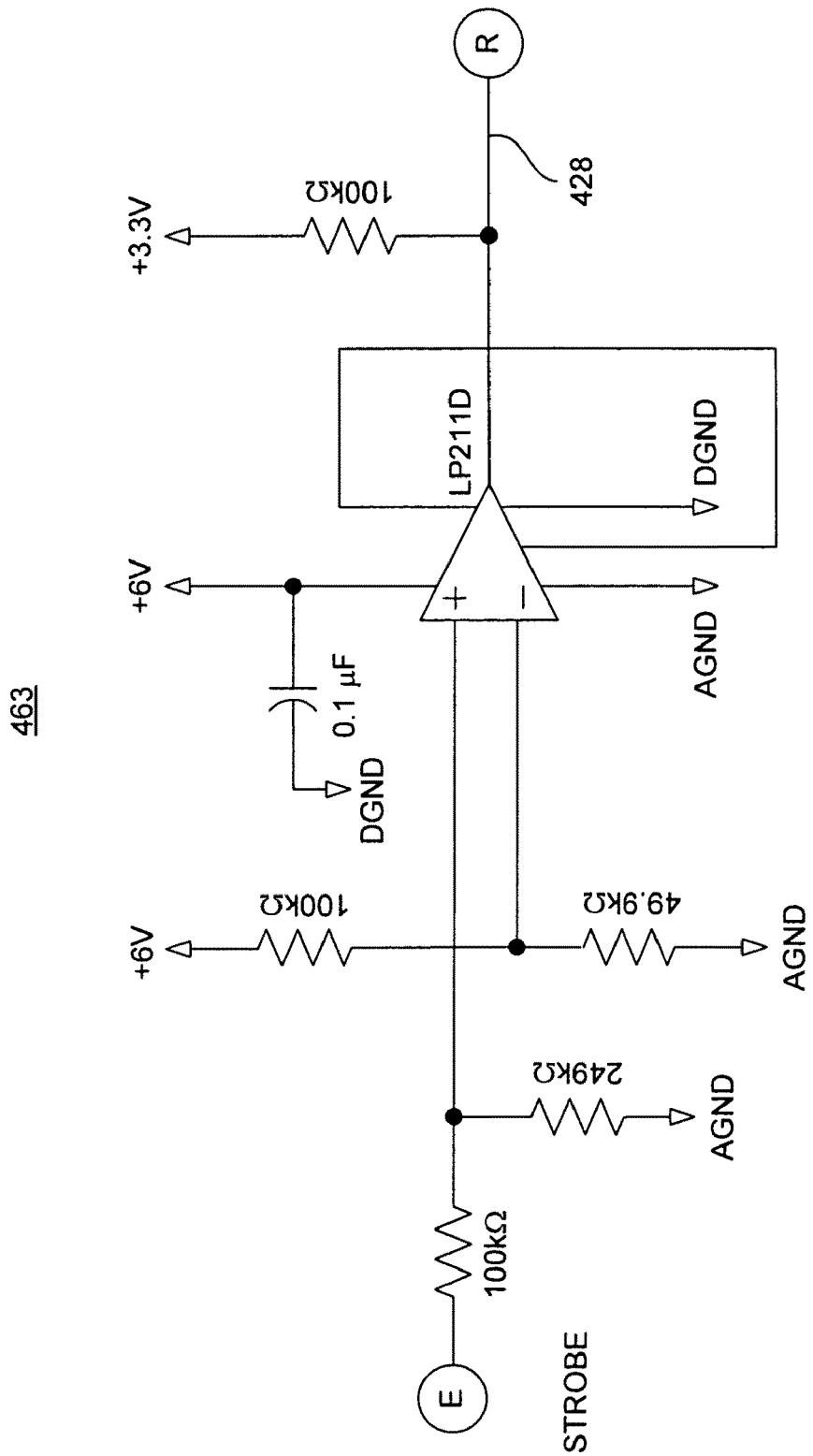
Figure 4I:
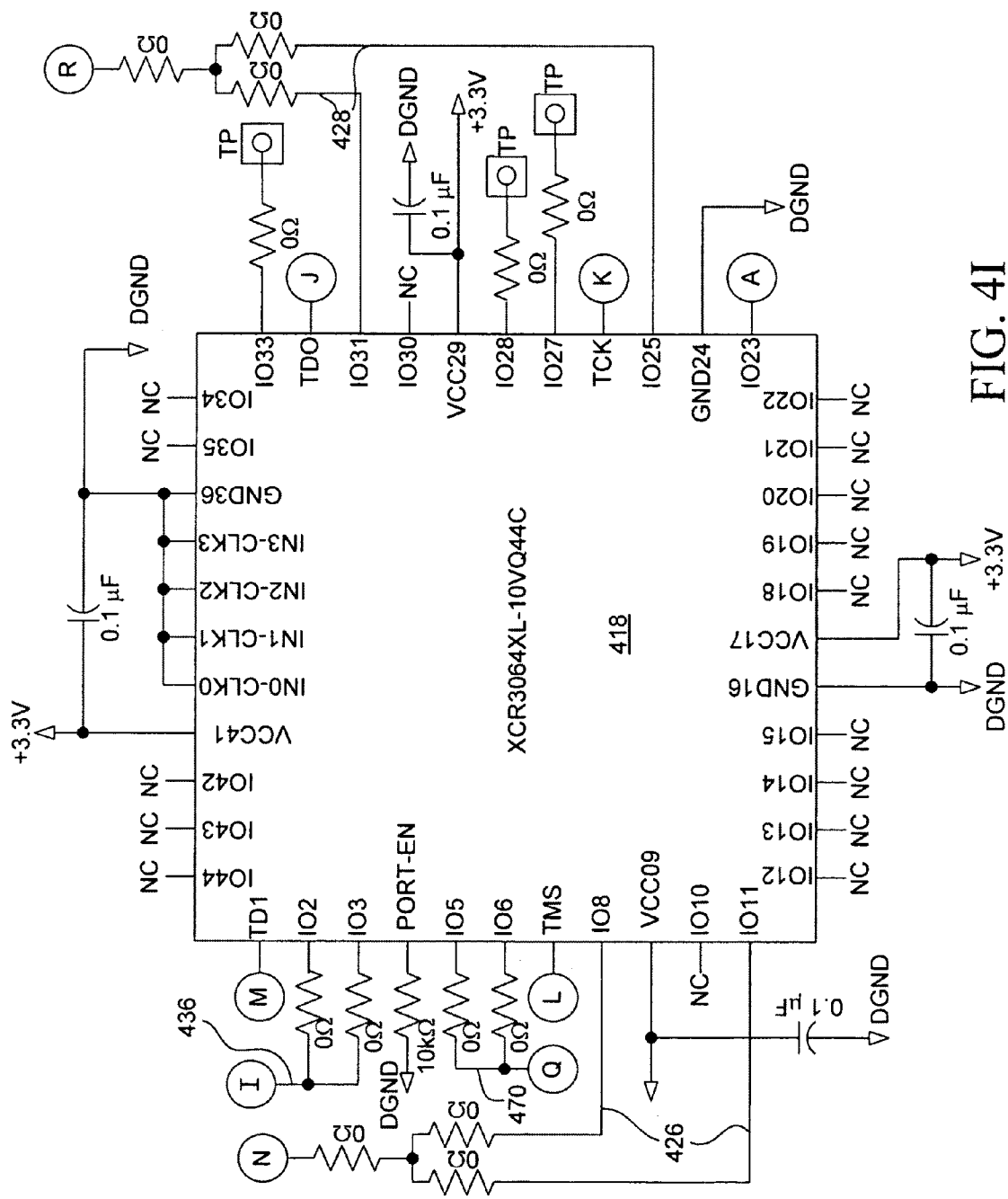

When comparator 462 receives a sync input, comparator 462 outputs a logic signal 426 which provides a reset, or synchronization signal to FPGA 418 on the low power channel control circuit of FIG. 4I. Similarly, when comparator 463 receives a strobe input, comparator 463 outputs a logic signal 428 that provides a strobe signal to FPGA 418. In one embodiment, sync signal 426 and/or strobe signal 428 may be provided to FPGA 418 via redundant input lines for enhanced reliability. FPGA 418 may comprise any suitable programmable logic device, such as a XILINX type XCR3064XL-10VQ44C.

If comparator 463 outputs a strobe signal 428, strobe signal 428 increments a timing element, or counter, maintained by FPGA 418. If comparator 462 outputs a sync signal 426, it clears the counter maintained by FPGA 418. A value unique to the channel is pre-programmed into FPGA 418 through programming signal lines 414a, 414b, 414c, and 414d, shown on the channel programming port of FIG. 4E. In this embodiment, signal lines 414a, 414b, 414c, and 414d correspond to JTAG compliant ports TDO, TCK, TDI, and TMS, respectively, for FPGA 418. Within FPGA 418, a storage element comprising, for example, EEPROMs, holds this unique value in memory. This value indicates the time period within a cycle that the channel should be active, i.e., presenting an impedance to the probe pulse signal lines which represents a sampled amplitude held by sample & hold circuit 438. When the contents of the counter equals the unique channel value, output gate signal 436 is asserted. Otherwise, signal 436 remains unasserted.

Refer now to the low power sample & hold circuit of FIG. 4G. When FPGA 418 receives a sync signal 426, it sends out a sample & hold control signal 470 to a high-impedance switch 472 in sample & hold circuit 438. As long as sync signal 426 is asserted, switch 472 closes, allowing sample & hold circuit 438 to hold a sensor input signal P by storing a voltage in capacitor 474. Sample & hold circuit 438 holds this value until the next assertion of the control signal 426. Until then, the circuit 438 outputs, through op amp 476, a signal representative of its held value that is proportional to the sampled value of sensor output 440. Switch 472 may comprise an Analog Devices ADG801BRM low voltage CMOS switch, or equivalent. Op amp 476 may be any suitable device, such as a Texas Instruments type TLV2221CDBVR, or equivalent.

In an alternative embodiment, sample & hold circuit 438 may be configured with a means for shorting sensor output 440 to the output of op amp 476, for example, by installing zero-ohm resistors, as shown. Bypassing sample & hold circuit 438 allows further reduction in system power consumption where skewing effects are not critical. In such a case, the channel will acquire whatever sensor output 440 exists at the time a sync signal 426 is asserted.

When FPGA 418 receives a sync signal from the termination device, it asserts sample & hold control signal 426. The assertion of sample & hold control signal 426 causes the sample & hold circuit 438 to sample the amplitude of the signal present on input line 440, and store the same in capacitor 474. Sample & hold circuit 438 holds this value until the next assertion of the control signal 426. Until then, the circuit 438 outputs a signal representative of its held value on signal line 468.

Refer now to FIGS. 4C and 4D. Element 444 comprises a FET which functions in this particular example to provide the voltage controlled impedance for the channel. FPGA 418 controls whether FET 444 is turned on, thereby outputting an impedance representative of a sensor output level, or whether FET 444 is turned off, thereby outputting a high impedance. When output gate signal 436 is asserted, indicating that the designated time period for the channel is not present, switch 442 couples output gate 436 to the non-inverting input of op amp 478, effectively shorting the input to op amp 478 and turning FET 444 off, i.e. causing FET 444 to present an open circuit impedance across its output. When output gate signal 436 is not asserted, indicating that the designated time period for the channel is present, the sample & hold output signal 458 drives the non-inverting input to op amp 478, allowing op amp 478 to display a voltage level representing the amplitude of a signal previously sampled from sensor output 440. This voltage becomes a bias voltage at the gate of the FET 444, turning FET 444 on and thereby presenting an impedance at the output of FET 444. FET 444 operates in a linear range such that the output of the FET, which is coupled to probe pulse signal lines 406a and 406b, presents to these signal lines an impedance representative of the sensor output 440. In one exemplary embodiment, FET 444 may comprise a type VCR2N or equivalent. In another embodiment, op amp 478 may comprise a Texas Instruments OPA704NA type device, or equivalent.

In one aspect of the invention, the output of FET 444 presents a resistance across probe pulse signal lines 406a and 406b representative of a sensor output 440. The value of this resistance presents an impedance mismatch across 406a and 406b, causing a reflected signal to occur whenever lines 406a and 406b transmit an interrogation pulse. The amplitude of that reflection is proportional to the resistance; thus, the reflected interrogation pulse comprises a signal modulated in proportional to sensor output 440.

Referring again to FIG. 4G, sensor output 440, which is the input to sample & hold circuit 438, comprises an output signal of a sensor corresponding to any of sensors 110 through 110e as shown in FIG. 1. Any sensor, or sensor/transducer combination, may be used including but not limited to an acoustic sensor such as a hydrophone, or a magnetic, electromagnetic, or Hall effect sensor, or any other sensor or sensor/transducer that is capable of measuring a physical parameter and providing an output signal representative of the measured parameter, such as devices that measure flow, temperature, pressure, voltage, current, light, radiation, velocity, acceleration, etc. In one application, the sensor is part of a sensor array configured for underwater surveillance.

In one embodiment, sensor output 440 comprises the output of a signal conditioning circuit that provides a proper interface to sample & hold circuit 438. For example, a signal conditioning circuit may provide any of various signal processing functions well known in the art such as pre-amplification, anti-alias filtering, etc. and may also provide a desired signal-to-noise ratio through lowpass filtering techniques, etc., for a signal comprising sensor output 440. Proper conditioning may also require sensor output 440 to be scaled to within a desired voltage signal range compatible with the operational characteristics of the telemetry system.

Figure 5:
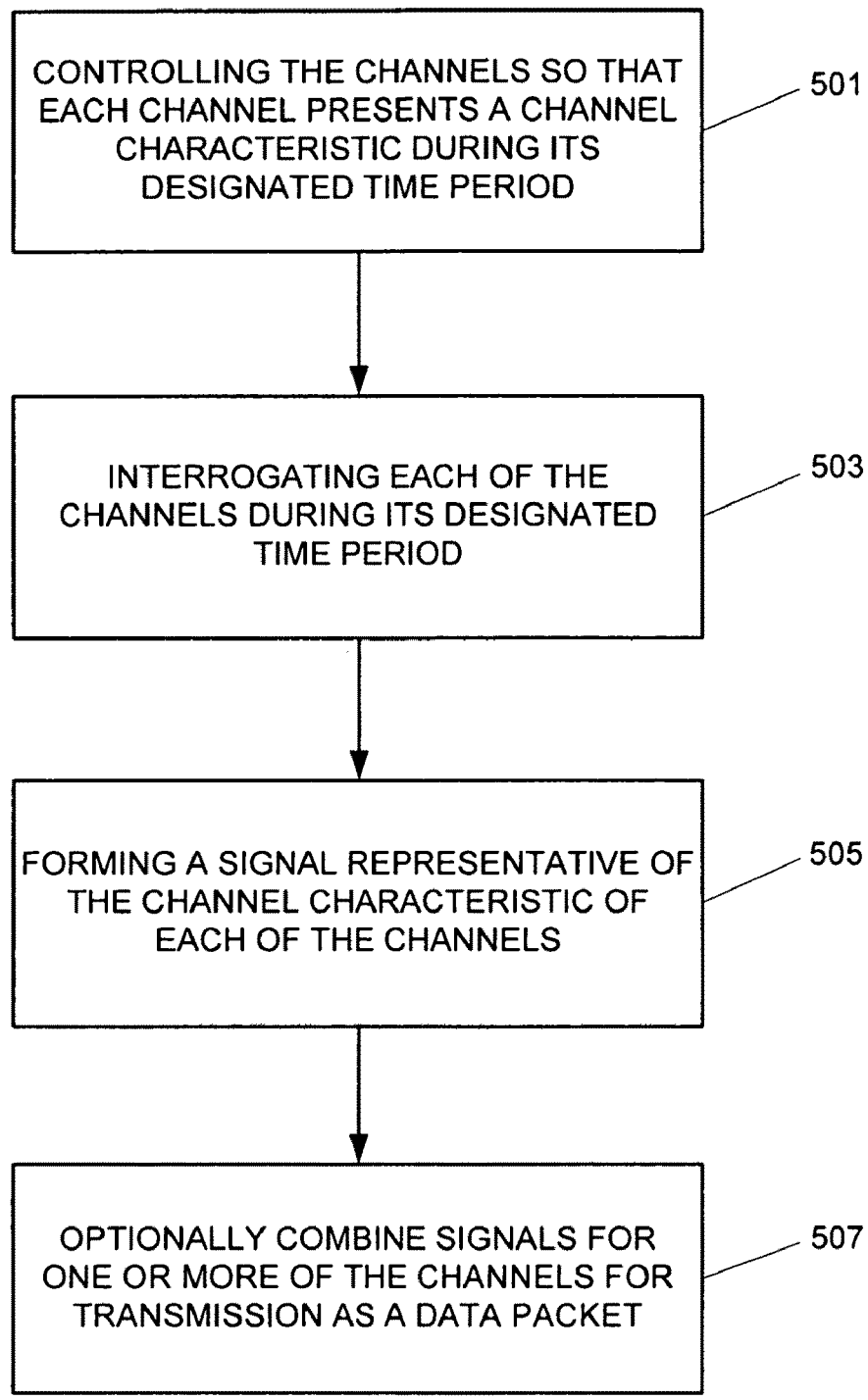
FIG. 5 is a flowchart of one embodiment of a method of telemetering one or more channels coupled to a bus.

FIG. 5 is a flowchart illustrating one embodiment of a method 500 of telemetering one or more channels coupled to a bus. Step 501 comprises controlling the channels so that each channel presents a channel characteristic to the bus during a designated time period for the channel. The next step 503 comprises interrogating in the analog domain each of the channels during its designated time period. The next step 505 comprises forming a signal representative of the characteristic presented by the channel during its designated time period. Optional step 507 comprises combining the signals from one or more of the channels to form a packet, and then transmitting or outputting the packet. From optional step 507, the method branches back to step 501 for another cycle.

Figure 6:
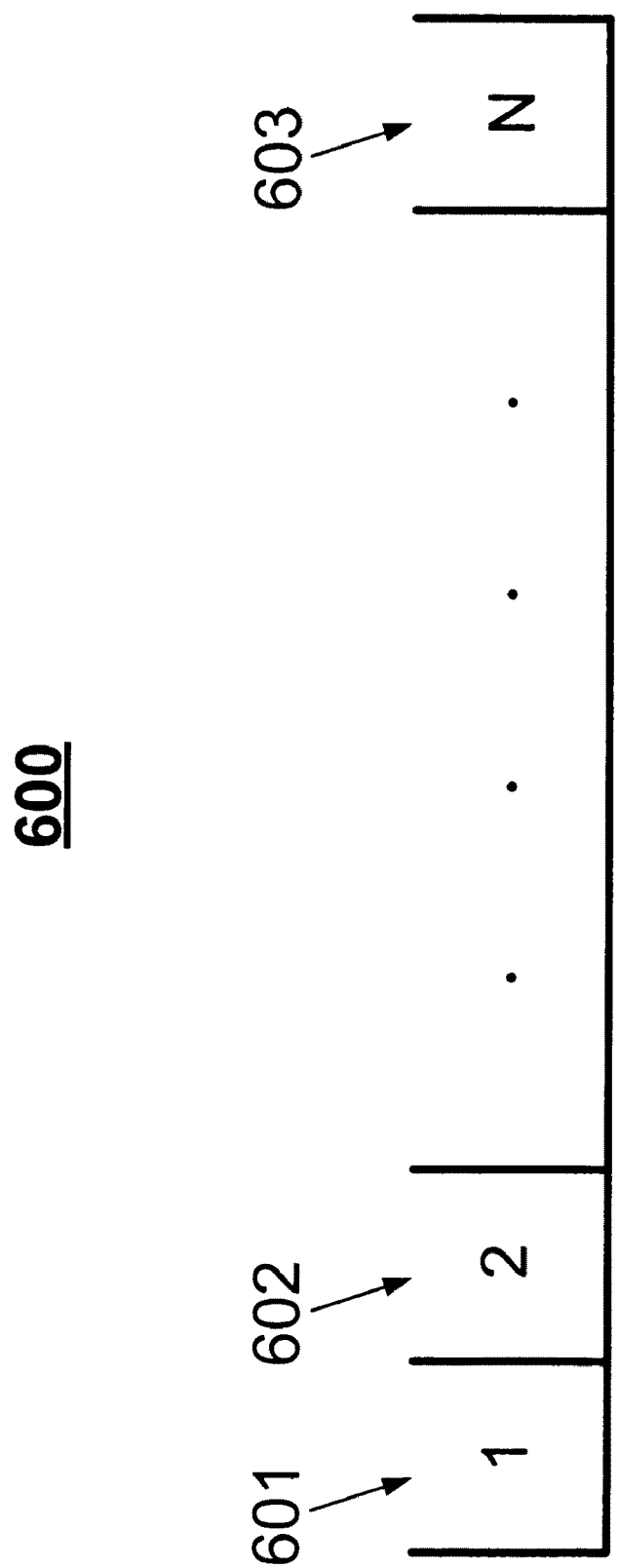
FIG. 6 is a diagram illustrating one example of the time periods within a cycle.

Step 501 may comprise time division multiplexing the channels onto the bus so that each and only one channel presents a channel characteristic to the bus during a time period designated for the channel. FIG. 6 illustrates a typical cycle 600 divided up into N time slots, one for each of the channels in a telemetry system. Time slot 601 is designated for channel 1, time slot 602 is designated for channel 2, and time slot 603 is designated for channel N. During time slot 601, channel 1 alone presents its characteristic to the bus. During time slot 602, channel 2 alone presents its characteristic to the bus. During time slot 603, channel N alone presents its characteristic to the bus. The bus may have one or more signal lines, and method 500 may further comprise controlling and providing power to each of the channels through the same one or more signal lines of the bus.

In the case in which the channel characteristic presented by the channel is a channel impedance representative of the amplitude of a signal sampled by the channel, assuming time division multiplexing is in effect, each channel presents its impedance to the bus during its designated time period. However, at all other time periods in the cycle, each channel presents an open circuit equivalent impedance to the bus. Thus, in FIG. 6, during time period 601, channel 1 presents its impedance to the bus, and all the other channels present an open circuit equivalent impedance to the bus. During time period 602, channel 2 presents its impedance to the bus, and all the other channels present an open circuit impedance to the bus. During time period 603, channel N presents its impedance to the bus, and all the other channels present an open circuit impedance to the bus.

The method 500 in FIG. 5 may further comprise synchronizing the channels so that each one samples the amplitude of a signal at about the same time. This helps prevent clock skew and unwanted phase differences between channels in coherently processed high frequency applications. In one example, this synchronization is provided by a sync signal provided at the inception of a cycle. The sync signal causes a sample & hold circuit at each of the channels to perform a sample & hold function at about the same time. This sync signal may perform other synchronization functions, such as resetting counters maintained at each of the channels for purposes of locating the designated time period for the channel.

Method 500 may also comprise controlling and providing power to each of the channels through a differential signal transmitted over the same one or more signal lines. This differential signal may have first and second states, and the differential signal may provide power to the channel in the first state and perform a control function at the channel in the second state. While the differential signal is in the second state, a power storage element at the channel may be switched in to provide power to the channel.

Method 500 may further comprise identifying the time period designated for the channel by clocking a timing element or counter at each of the channels through a clocking or strobe signal sent over the bus. The timing element or counter is updated responsive to the clocking signal, and the contents thereof may then be compared with a unique channel identifier. If the two are equal, the time period designated for a channel is determined to be present.

Method 500 may further comprise programming one or more of the channels with a predetermined value for the channel. In one example, the method further comprises remotely programming the one or more channels with the predetermined value for the channel.

The impedance presented by a channel to the bus during the designated time period may give rise to an impedance mismatch condition at the channel. The channel may then be interrogated during its designated time period by transmitting an analog pulse over the bus. The impedance mismatch at the channel causes at least a partial reflection of the pulse to return to a termination device coupled to one end of the bus, where the amplitude of the reflected pulse is representative of the impedance presented by the channel.

Method 500 may also comprise performing at least partial equalization of the transmitted pulses to compensate for variable attenuation caused by different distances between the termination device and each of the channels.

The signals for one or more of the channels may be combined into a data packet at the termination device. The packet may further be transmitted to a local controller, to a storage device, or to a remote location over a network.

The one or more signals may be processed using a programmable procedure. In one example, the procedure is remotely programmable. In another example, the procedure comprises a transformation applied to the one or more signals. In third example, the procedure comprises a feature extraction procedure. In a fourth example, the procedure combines the one or more values into a beam.

The procedure may comprise a search procedure. It may also comprise a predetermined mode or schedule for interrogating the channels. In one example, the procedure changes the order, timing, sequence, or frequency at which the channels are interrogated during a cycle. For instance, an example array may comprise 32 channels. In a first mode of operation, each of the 32 channels may be interrogated during a cycle. However, in a second remotely programmed mode of operation, only some of the channels may be interrogated during a cycle at a higher frequency of interrogation than in the first mode of operation.

Figure 7:
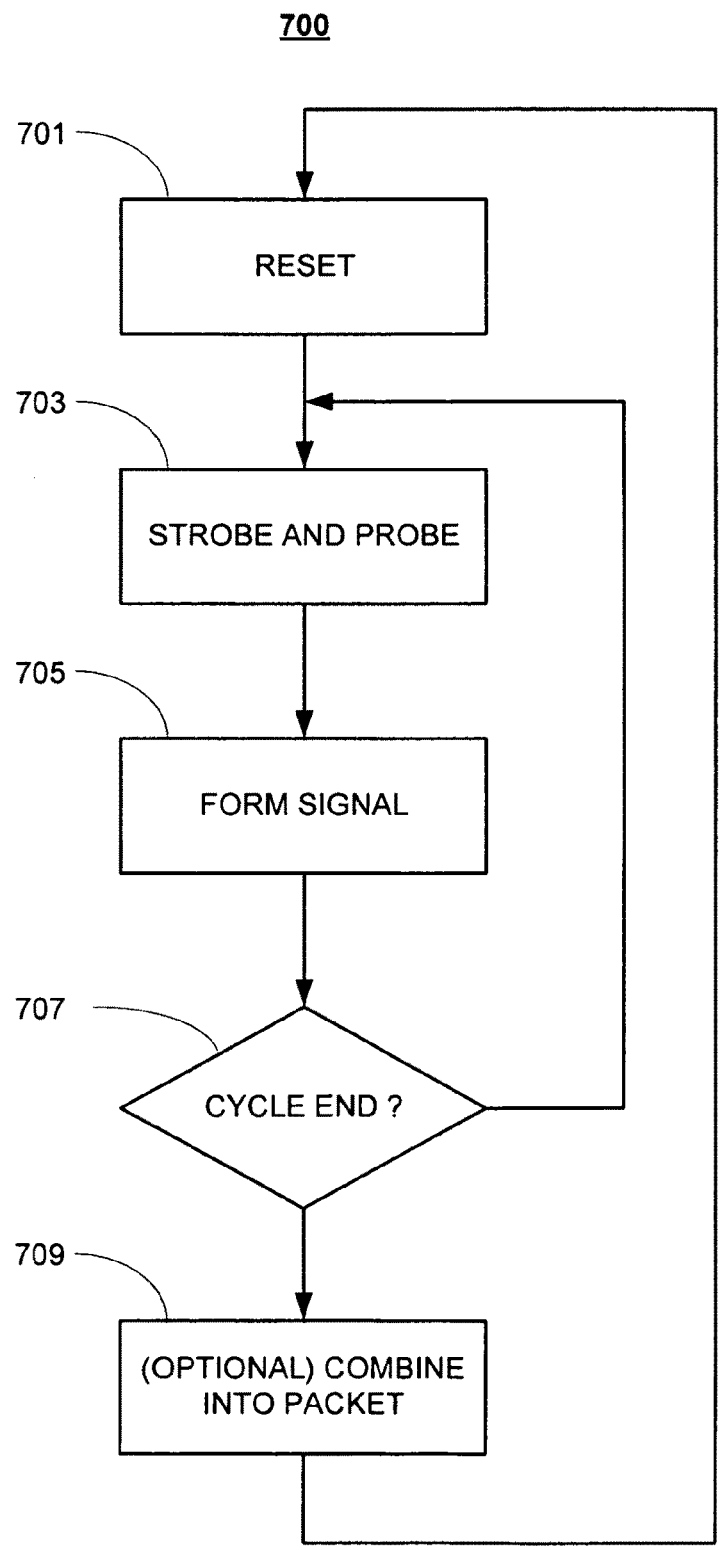
FIG. 7 is a flowchart of one implementation example of a method of telemetering one or more channels coupled to a bus.

FIG. 7 is a flowchart of an implementation 700 of a method of telemetering a plurality of channels coupled to a bus. In step 701, at the inception of a cycle, a sync signal is transmitted over the bus to each of the channels. The sync signal may cause a sample & hold circuit at each of the channels to sample at about the same time the amplitude of a sensed signal input to the circuit at the channel. In addition, the sync signal may cause a counter at each of the channels to sync.

In the next step 703, at the inception of or during a discrete time period within the cycle, a strobe signal and a probe pulse is transmitted over the bus to each of the channels. The strobe signal may cause a counter located at each of the channels to increment or decrement depending on the implementation. If the counter indicates that the designated time period for the channel has arrived, the channel may present an impedance to the bus which is representative of the sampled amplitude held by the sample & hold circuit at the channel. Each of the other channels may present an open circuit equivalent impedance to the bus such that the impedance presented by the one channel gives rise to an impedance mismatch. An analog probe pulse may be used to interrogate the channels. The impedance mismatch at the one channel causes a reflected version of the probe pulse, with the amplitude thereof modulated based on the impedance presented at the channel, to reflect back to the termination device which originated the probe pulse. The open circuit equivalent impedance presented by the other channels causes the pulse to terminate at these other channels.

In step 705, a signal is formed which is representative of the modulation of the reflected pulse from the one channel. This signal may be formed at the termination device.

In inquiry step 707, an inquiry is made whether there are still more time periods within the cycle. If so, a branch is made back to the beginning of step 703. If not, a branch is made to optional step 709. In optional step 709, the signals for one or more of the interrogated channels are combined into a digital packet. This packet may then be transmitted to a local controller or over a network. A branch may then made back to the beginning of step 701 for another cycle.

Figure 8:
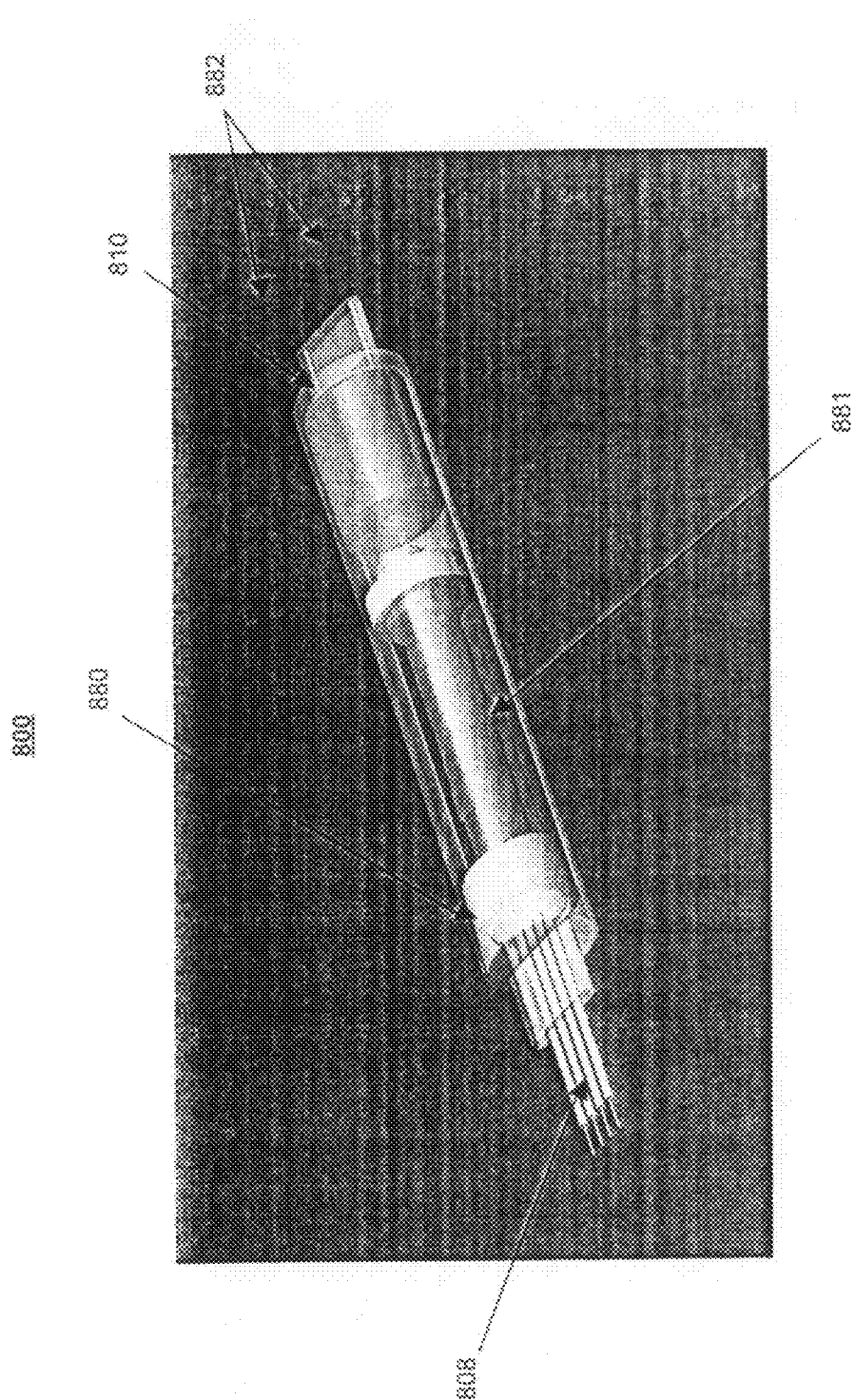
FIG. 8 illustrates one embodiment of a submersible enclosure for containing a sensor and sensor conditioning electronics in a telemetry channel according to the invention.

In one implementation of the present invention, a sensing channel employing the foregoing techniques may be packaged within a hermetically sealed, waterproof, and/or submersible enclosure for use in marine surveillance applications. An example of one such enclosure 800 is shown in FIG. 8. In this example, an outer shell 880 encloses a sensor 810, channel electronics 881, and sensor leads 882. Sensor 810 may comprise any sensing device or transducer capable of generating a detectable signal, such as an acoustic, magnetic, MEMS, seismic, e-field, environmental, and CBRNE type sensors. Channel electronics 881 comprise the telemetry and sensor conditioning circuits described in FIGS. 3 and 4A-4I. Power and signal wires 808 (corresponding to signal lines 108a-108d in previous embodiments) are at least partially enclosed by shell 880. In one example, wires 880 are polyethylene insulated. Shell 880 may be formed from any material suitable for the application, for example, a molded thermoset plastic. In a prototype channel sensor, shell 880 was formed from two halves of polyethylene material, later sealed by an electron beam welding process after installing the internal components. A potting compound such as polyurethane may be injected to fill voids prior to sealing. The finished enclosure 800 has a diameter of about 1 to 2 cm, and a length of about 14 to 16 cm.

Figure 9:
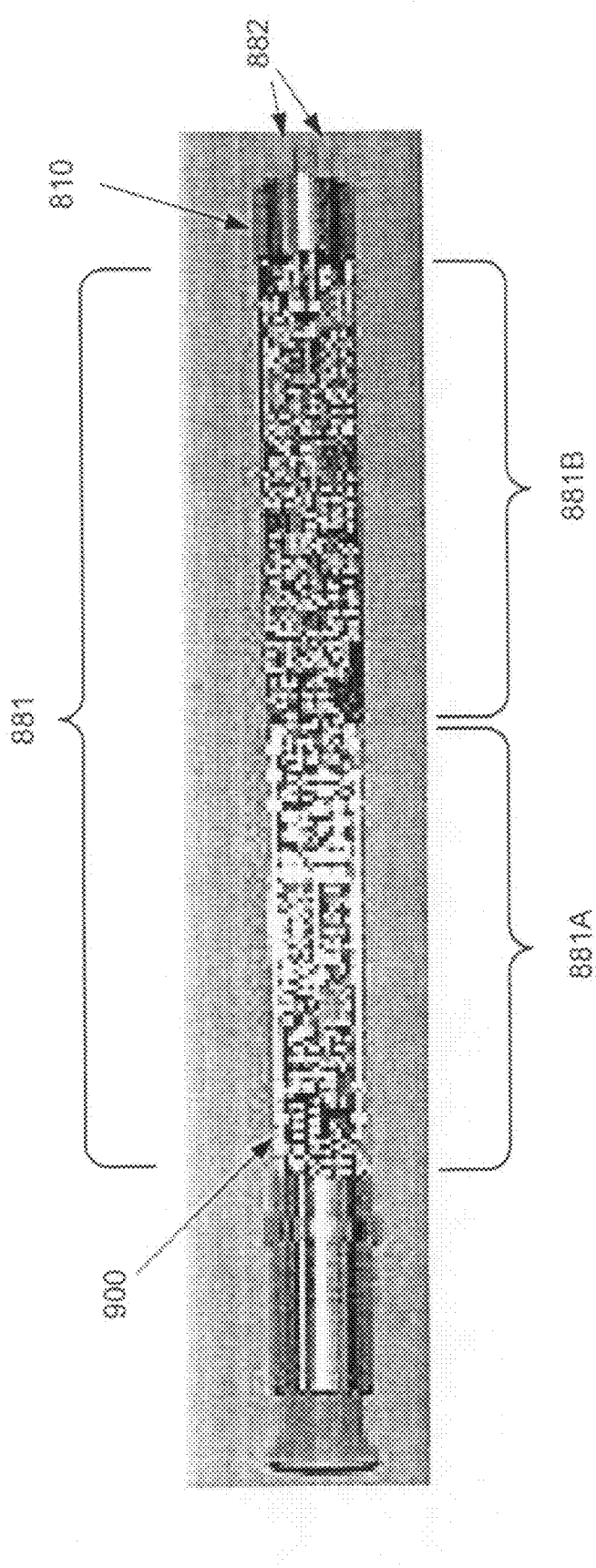
FIG. 9 shows one example of a circuit board containing sensor and sensor conditioning electronics mounted within the enclosure of FIG. 8.

FIG. 9 shows one example of a circuit board 900 mounted within a sensing channel submersible enclosure. Circuit board 900 includes the electronic components that make up channel electronics 881. The layout of these components is divided between left and right sections of the circuit board. The left-hand side of circuit board 900 contains telemetry electronics 881A coupled to power and signal wires 808. The right-hand side contains sensor conditioning electronics 881B coupled between telemetry electronics 881A and sensor 810.

FIG. 10A illustrates one embodiment of a telemetry system according to the invention wherein multiple sensing channels 1004 are displaced in a horizontal sensing array. Each channel 1004 comprises a submersible enclosure containing a sensor, sensor conditioning electronics, and telemetry electronics, and each channel 1004 is coupled via power and signal cables to a bus 1008. Channels 1004 are displaced at intervals (regular or irregular) along the bus, so that each sensor focuses on a different portion of underwater space, and the range of each channel overlaps that of one or more adjacent channels. In this configuration, channels 1004 can monitor the water channel above the array for intrusions caused by surface vessels, submarines, torpedoes, swimmers, or other waterborne threats. In one embodiment, up to 53 channels may be connected to a single bus.

In FIG. 10A, bus 1008 terminates at a controller or termination device (not shown) housed within a buoy 1083. Buoy 1083 may be further configured with an antenna 1084 for wireless transmission of a data packet assembled from sensing channel input, responsive to action by the controller. Buoy 1083 also includes a local power supply, such as a battery, fuel cell, solar cells, or generator powered by wind or waves. Alternatively, as shown in FIG. 10B, the controller, termination device, and antenna may be housed within an enclosure 1085 at a stationary location on land. In this case, the controller may transmit a data packet either wirelessly or via cable. Enclosure 1085 may include a local power supply, or it may be powered by an external source on land.

FIGS. 11A and 11B illustrate various implementations of a vertical sensing array using a telemetry system according to the invention. In a vertical sensing array, a bus 1108 configured with multiple sensing arrays 1104 is suspended from a buoy 1183. The arrays are displaced from each other in a manner similar to that of the horizontal array previously described. This configuration is useful in locations where water depth prohibits deploying horizontal arrays along a lake bed or ocean floor. For example, multiple vertical arrays may be positioned to form a protective perimeter around an offshore oil platform 1186. Or, vertical arrays may be positioned around a moored vessel 1187 for continuous monitoring of waterborne threats. In one embodiment, each vertical array is capable of transmitting data packets to a common network or computer system located on board the oil platform or moored vessel.

Figure 12:
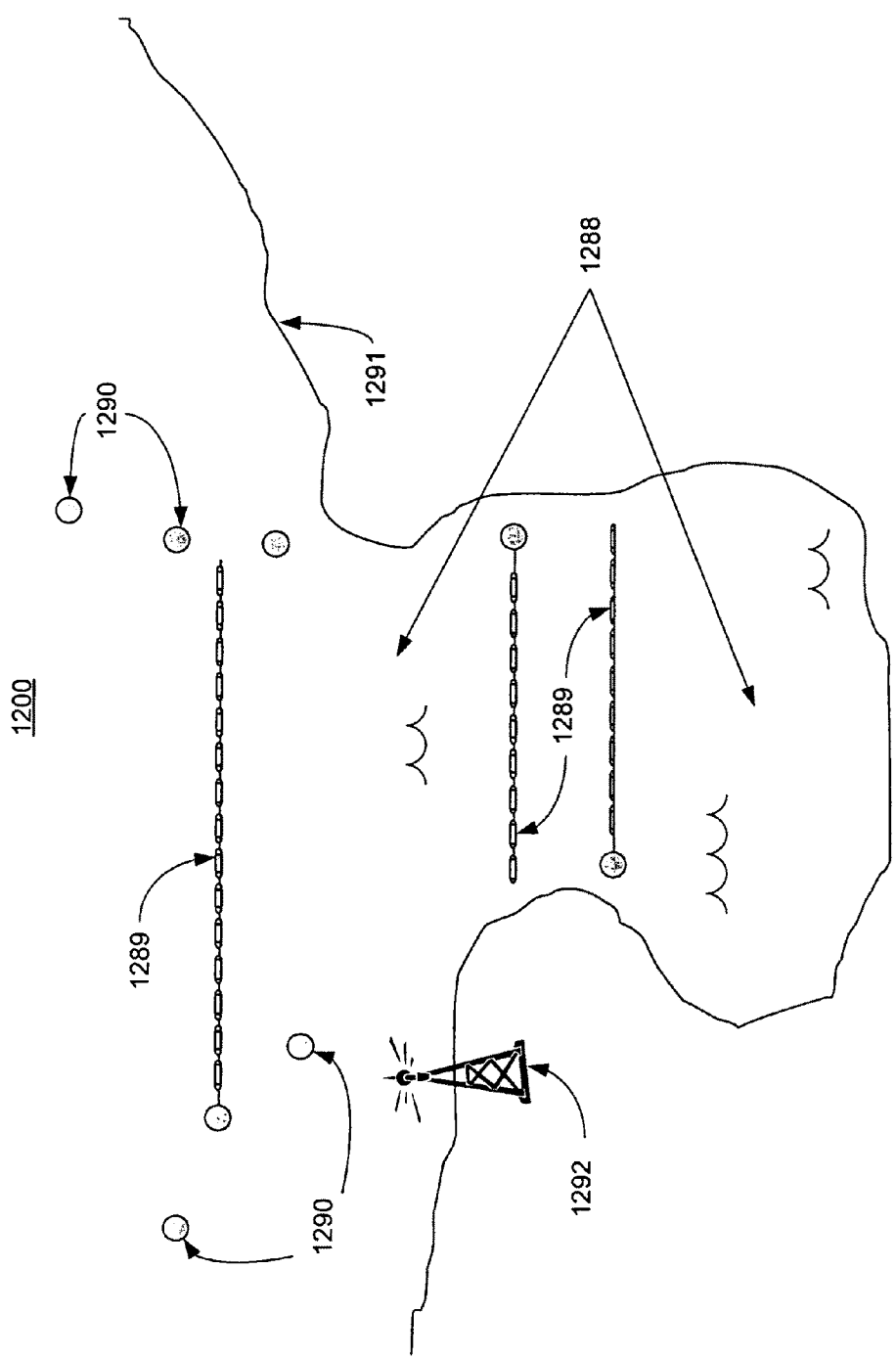
FIG. 12 illustrates an example of a multi-dimensional array for defending a coastline using a telemetry system according to the invention.

FIG. 12 illustrates another example of a telemetry system according to the invention ideally suited for homeland security or homeland defense applications for monitoring harbors or other restricted navigations zones. System 1200 comprises a multi-dimensional array field for surveillance of harbor area 1288. The multi-dimensional array field comprises a combination of horizontal sensing arrays 1289 and vertical sensing arrays 1290. Arrays 1289 and 1290 may be suspended from buoys configured to communicate wirelessly to a command center 1292. The arrays 1289 and 1290 are strategically located in and around harbor area 1288 for layered surveillance against surface and underwater threats approaching harbor area 1288, coastline 1291, and any vessels that may be anchored nearby. For example, a layered surveillance scheme may employ a first sensor type for detecting fast-moving attack vessels in the horizontal array that is furthest from shore, and a more sensitive second sensor type for detecting slow-moving threats (e.g. a swimmer) in a horizontal array that is closest to shore. Sensor types having various sensitivity levels may be located at intermediate positions in harbor 1288, as appropriate, to alert command center 1292 sufficiently in advance of the threat to allow effective countermeasures to be deployed. Similarly, the proximity of a vertical array to the ship or platform it protects corresponds to the sensitivity and/or sensor type or types employed in the vertical array.

Figure 13:
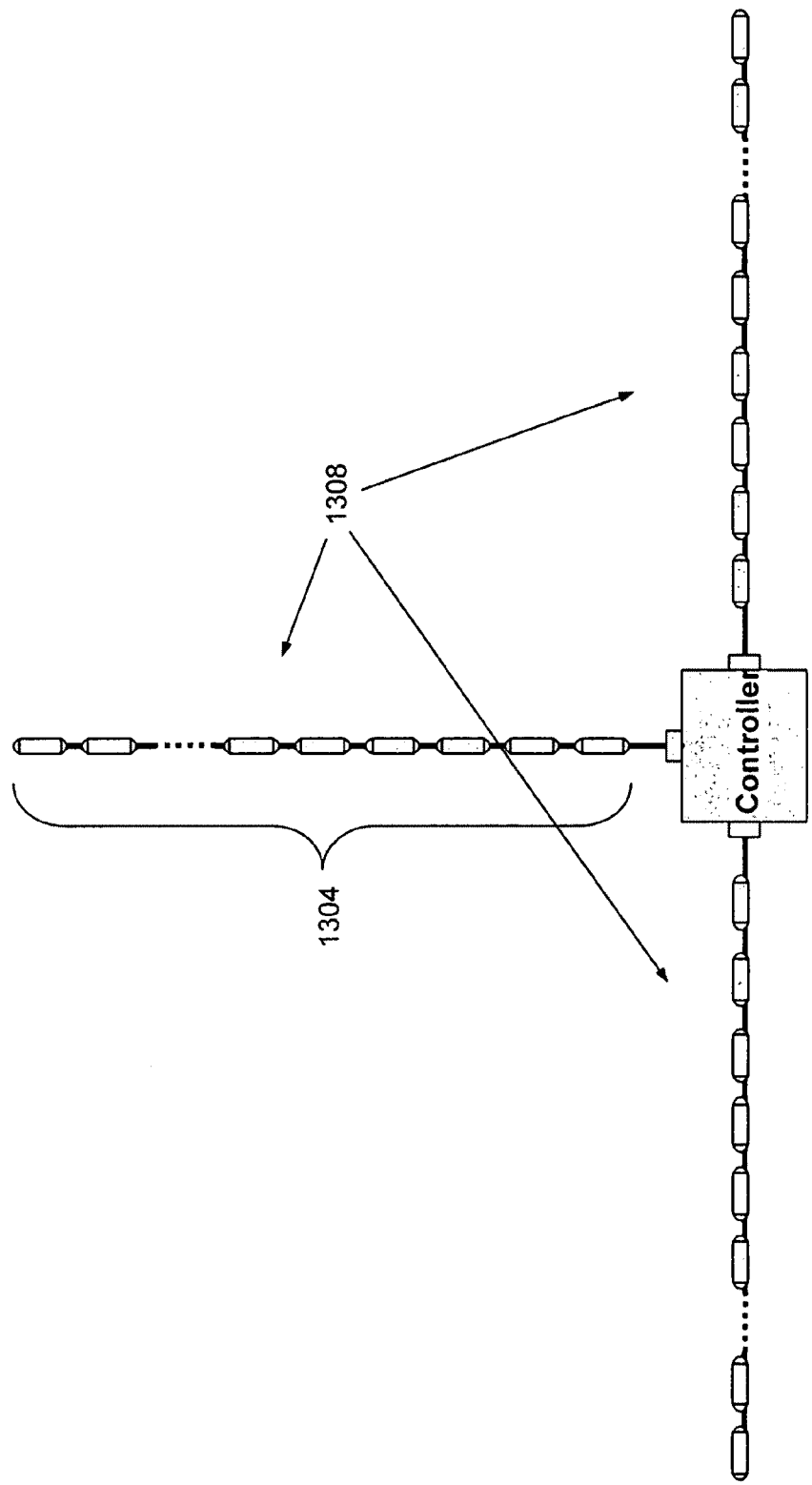
FIG. 13 shows a multi-bus configuration for a telemetry system according to the invention.

FIG. 13 illustrates a multi-bus configuration for a telemetry system according to the invention. In this configuration, a plurality of buses is coupled to a common controller, and each bus 1308 comprises a plurality of sensing channels 1304. Each sensing channel may comprise a sensor, sensor conditioning electronics, and telemetry electronics, as previously described. Due to signal processing constraints, one embodiment of a multi-bus system according to the invention is limited to 53 channels per bus and 3 buses per controller, or 159 total channels per controller. When in service, the channels in any one bus may comprise a horizontal array, a vertical array, or an array that is at least partially horizontal and partially vertical.

Figure 14:
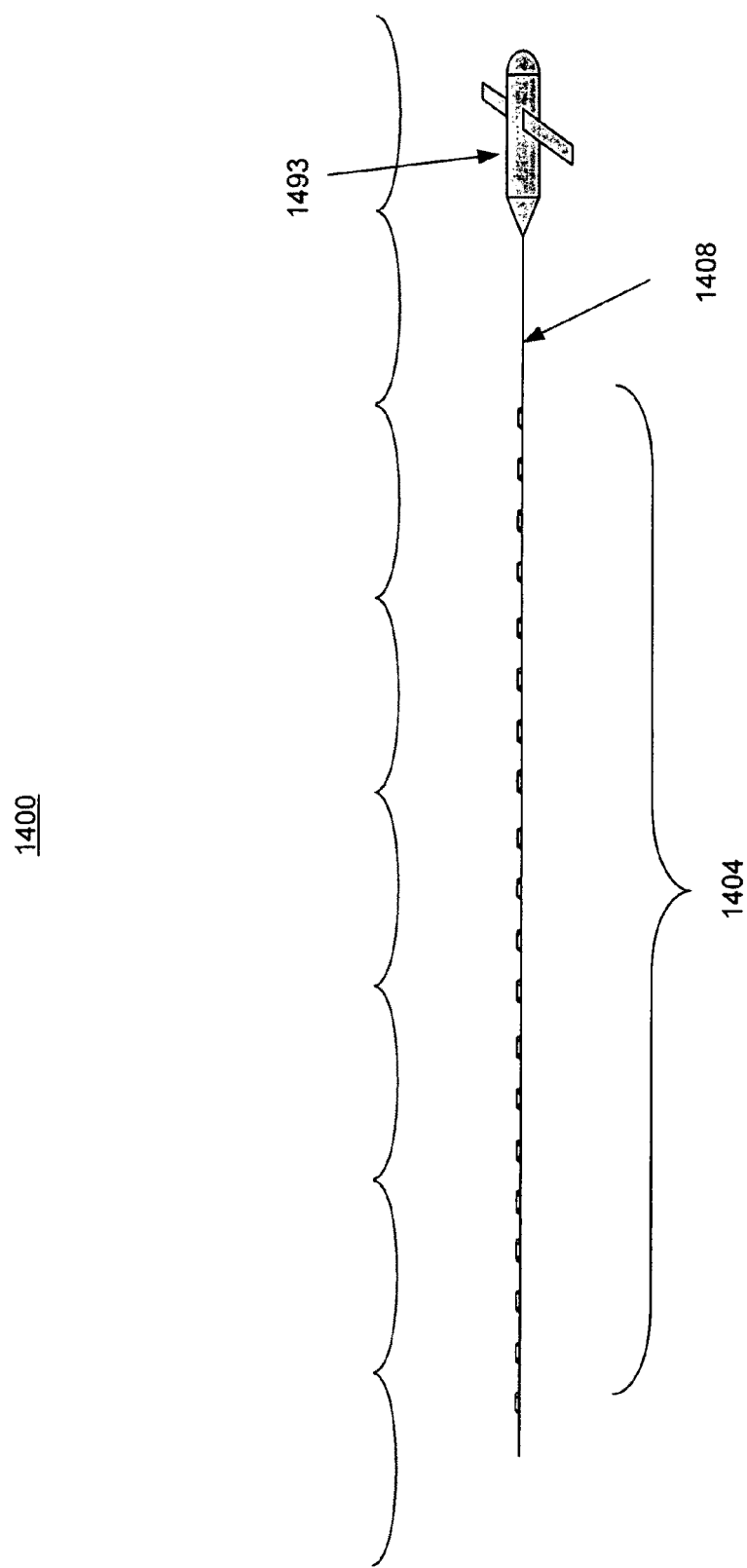
FIG. 14 illustrates a mobile marine surveillance system using a multi-channel telemetry system according to the invention.

FIG. 14 illustrates a mobile marine surveillance system 1400 using a multi-channel telemetry system according to the invention. System 1400 is similar to a horizontal or vertical sensor array having multiple sensing channels 1404, except that bus 1408 is towed behind a marine vehicle means 1493. The marine vehicle means may be a surface or underwater craft, may be manned or unmanned, may be autonomous, or may be operated by remote control. As in buoy 1083, marine vehicle means includes a termination device, controller, transmitter, antenna, and local power source for the telemetry system.

Figure 15:
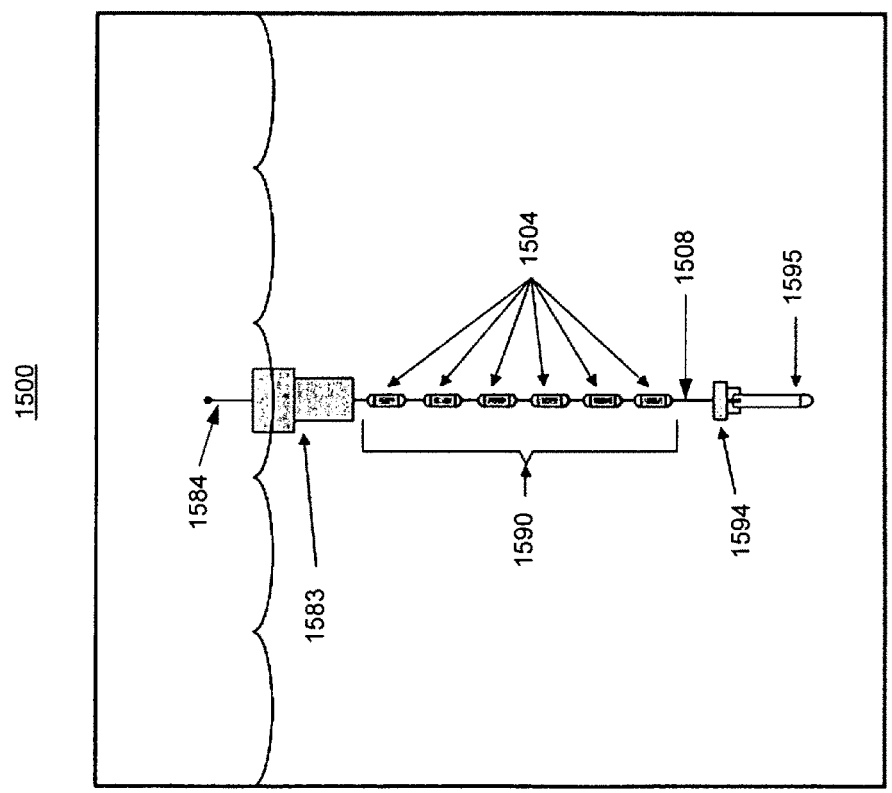
FIG. 15 illustrates an example of a remote waterborne device for triggering a defensive countermeasure using a telemetry system according to the invention.

Yet another application for a telemetry system according to the invention is depicted in FIG. 15. System 1500 comprises a remote vertical sensing array 1590 configured to sense a waterborne threat and to trigger a defensive countermeasure for neutralizing the threat. Buoy 1583 is configured with a controller, a termination device, and a transceiver coupled to bus 1508. Buoy 1583 also includes an extendable and retractable antenna 1584 for communicating with a host platform located on land, offshore, or on an ocean-going vessel. Vertical sensing array 1590 is suspended from buoy 1583, and a plurality of submersible sensing channels 1504 are displaced at intervals along bus 1508. Each sensing channel 1504 is coupled to bus 1508.

As described herein in the context of systems 100 and 200, the controller (not shown) located within buoy 1583 provides power to each sensing channel 1504, and controls each sensing channel 1504 to present a channel impedance to bus 1508 during a time period designated for the channel. During that same time period, the controller interrogates the channel by sending, from the termination device, an analog pulse over bus 1508. As a result of the interrogation, the controller receives as a channel output signal a partial reflection of the pulse returning to the termination device. The amplitude of the reflected pulse represents an impedance mismatch proportional to a signal sensed by the sensing channel being interrogated. The controller then combines signals from multiple channels into a packet and transmits the packet via the transceiver to the host platform. If the content of the transmitted packet indicates the presence of a waterborne threat, the host platform may transmit a firing signal back to system 1500.

System 1500 further comprises a triggering means 1594 for triggering a defensive countermeasure 1595 responsive to receiving a firing signal from the host platform. The defensive countermeasure 1595 may comprise a mine, a depth charge, a torpedo, or other lethal or non-lethal response. In another embodiment, system 1500 may operate autonomously, wherein, responsive to sensing a characteristic signal of a waterborne threat, the controller triggers countermeasure 1595 directly, without receiving a firing signal from a host platform.

In another embodiment, system 1500 may be deployed by dropping buoy 1583 from an airplane or boat onto the surface of a body of water. During the drop, antenna 1584, sensing array 1590, trigger 1594 and countermeasure 1595 are maintained in retracted position inside buoy 1583. After impacting the surface, the controller adjusts these components to their fully extended positions.

FIGS. 16 through 19 provide various performance data from tests conducted on a prototype telemetry system manufactured according to the invention.

Figure 16:
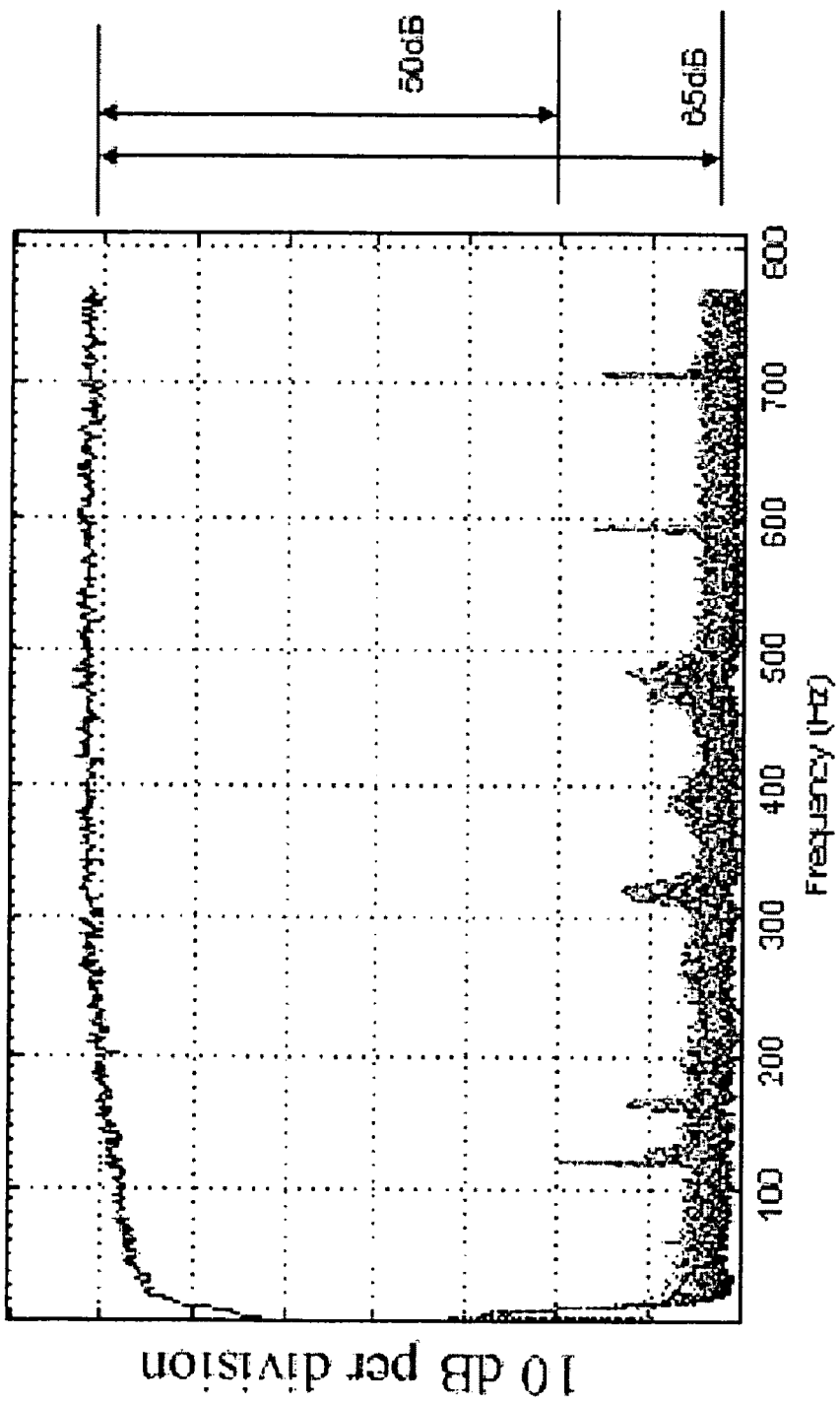
FIG. 16 is a plot showing the dynamic range of a prototype sensing channel embodying the teachings of the present invention.

The plot of FIG. 16 shows a broadband dynamic range of about 65 dB, nominal, above the inherent noise characteristics of the prototype system. The 60-Hz noise terms are attributable to the proximity of the prototype to a fluorescent lighting system of the test laboratory. The more broadband noise is associated with the clocking and control circuitry operating in the terminal electronics.

Figure 17:
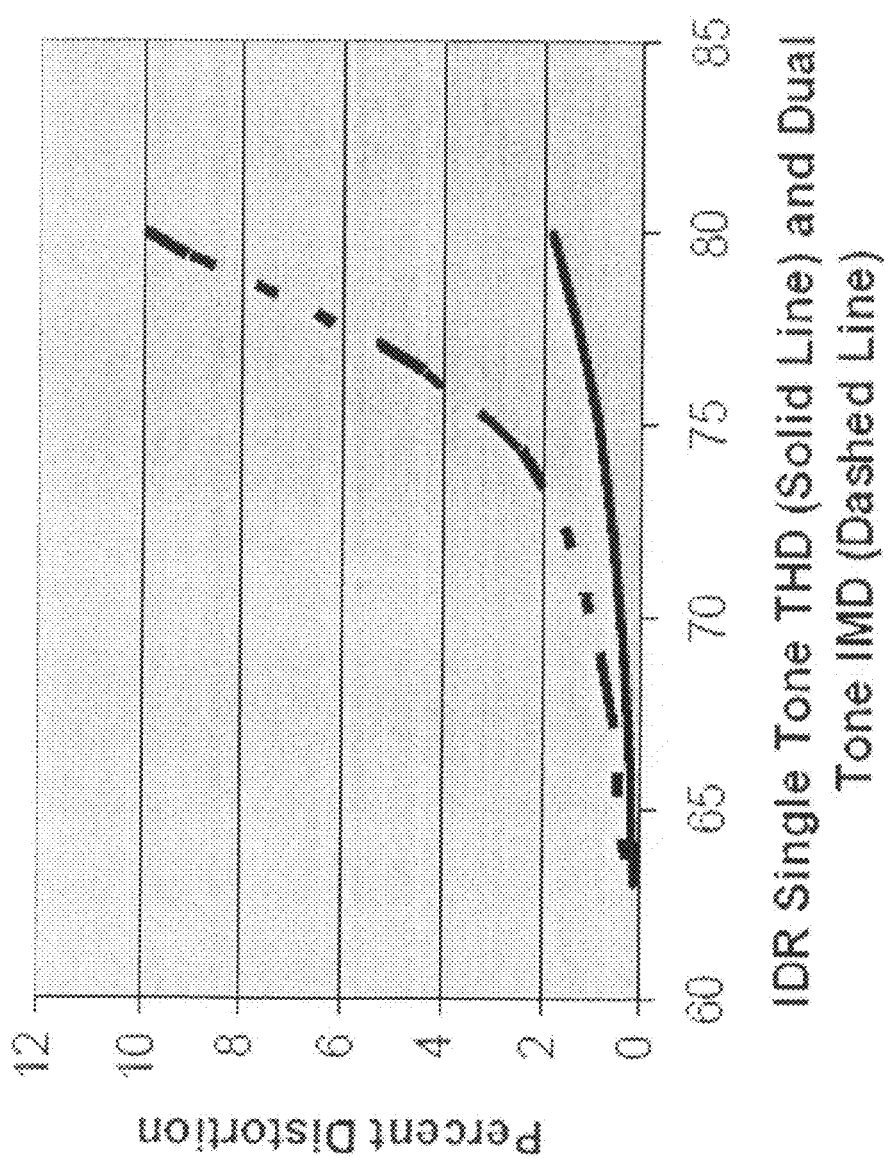
FIG. 17 illustrates the instantaneous dynamic range performance vs. percent THD and IMD in a prototype sensing channel.

The plot of FIG. 17 shows the narrowband or Instantaneous Dynamic Range (IDR) performance against percent of THD and IMD. This test illustrates the inherent nonlinearity associated with the reflectometry methods used in a low-power approach. With an increase in input amplitude at the input to the telemetry engine (i.e. the output of the sensor conditioning circuitry), a smooth compression of the signal is observed which rapidly increases the percentage of distortion for both THD and IMD.

Figure 18:
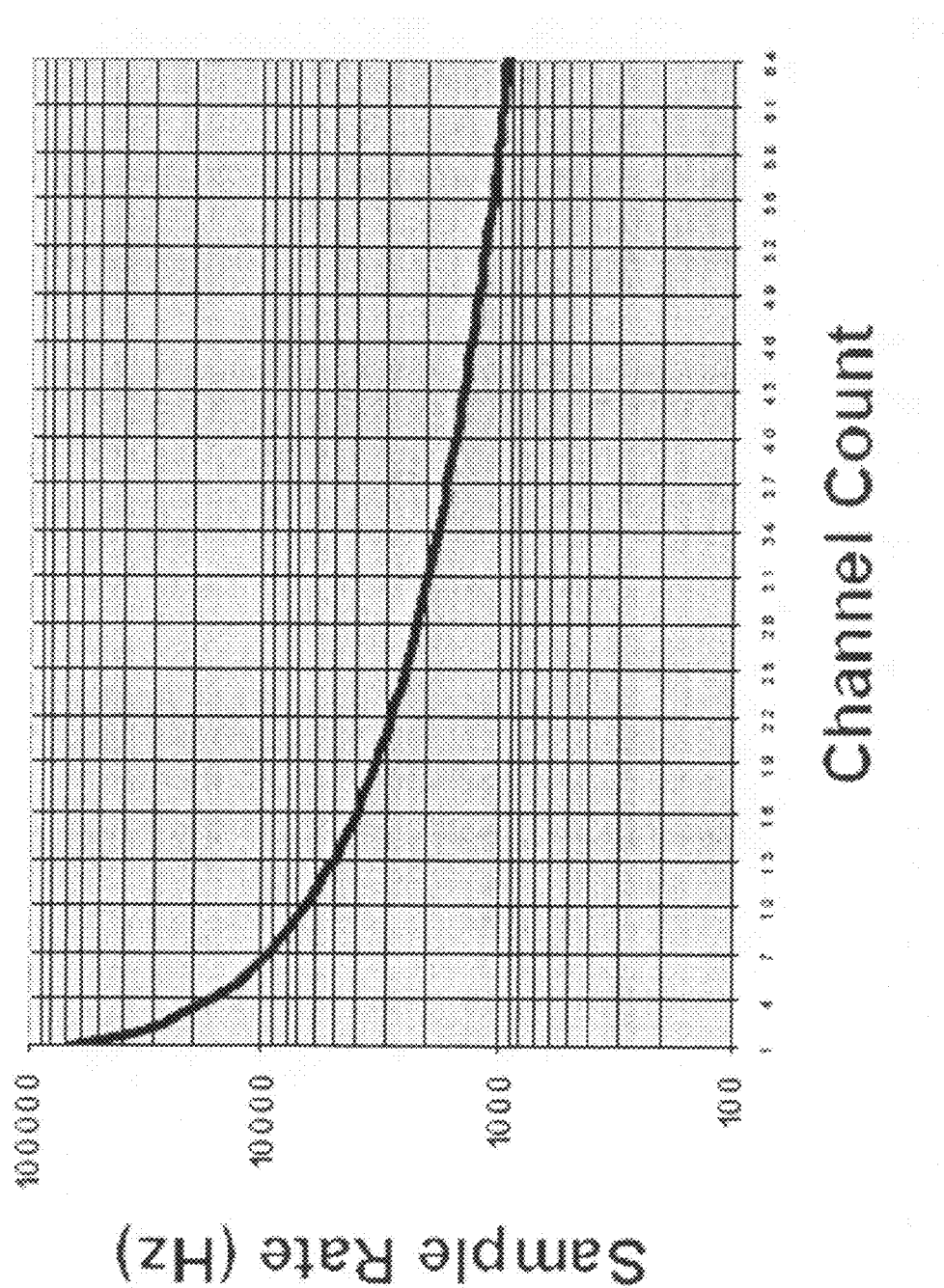
FIG. 18 is a chart showing the dependency of sampling rate on channel count in a telemetry system according to the invention.

The logarithmic curve of FIG. 18 shows sample rate vs. channel count in the prototype system. The prototype was constructed to issue a single probe pulse for each acquired channel. Given the combination of acquisition timing and the pulse time-of-flight, a trade-off between sampling rate and channel count develops. The curve denotes the deployment of evenly spaced channels 1 to 64 over a constant 500-meter cable assembly of four twisted 18-gauge signal wires. Modification to this cable configuration will cause a variation in the channel count associated with a given scenario. Smaller cable with shorter cable lengths would produce improvements in the time-of-flight timing but would degrade the pulse quality.

Figure 19:
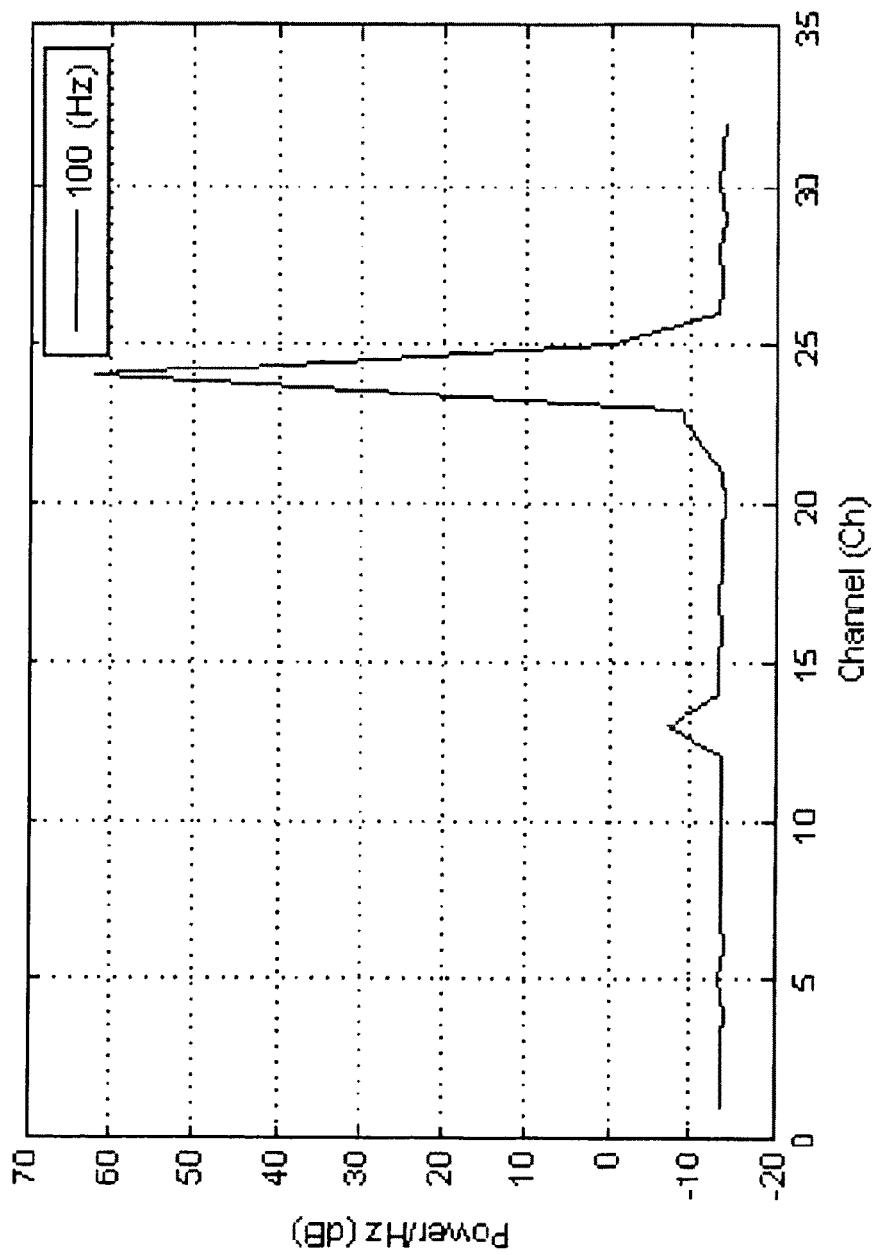
FIG. 19 is a graph of the channel-to-channel crosstalk observed under certain conditions in a telemetry system according to the invention.

Finally, FIG. 19 shows the results of a channel-to-channel crosstalk test. The crosstalk was tested by injecting a 100-Hz tone into a single channel and measuring the bleed-through, or power level of the 100-Hz tone observed over all other channels measured simultaneously. The plot shows that no channel experiences a crosstalk greater than 60 dB down from the single channel being driven.

While various embodiments of the invention have been described, it will be apparent to those of ordinary skill in the art that many more embodiments and implementations are possible that are within the scope of this invention.

What is claimed is:

1. A mobile marine surveillance system comprising:
   a termination device;
   a bus having a plurality of submersible enclosures displaced at intervals, each submersible enclosure enclosing a sensing channel coupled to the bus;
   a controller for (1) providing power to each channel, (2) controlling each channel to present a channel impedance to the bus during a time period designated for the channel, (3) transmitting, from the termination device, an analog pulse over the bus during the time period designated for each channel, and (4) receiving a channel signal from a partial reflection of the pulse returning to the termination device during the designated time period, the amplitude of the reflected pulse representing an impedance mismatch proportional to a signal sensed by the channel; and
   a marine vehicle means for towing the bus through water.

2. The system of claim 1 wherein each channel further comprises a variable impedance element that presents channel impedance proportional to the signal sensed by the channel.

3. The system of claim 1 further comprising a plurality of buses coupled to the controller, each bus coupled to a plurality of sensing channels.

4. The system of claim 1 wherein the controller further comprises a network interface configured to combine signals sensed by the channels into a packet for transmission over the network.

5. The system of claim 1 wherein each sensing channel comprises a sensor and sensor conditioning electronics contained within a submersible over-molded enclosure.

6. The system of claim 1 wherein each sensing channel includes a sensor type selected from the group comprising acoustic, magnetic, MEMS, seismic, e-field, environmental, and CBRNE.

7. The system of claim 6 wherein at least two sensing channels have different sensor types.

8. A remote waterborne telemetry system for triggering a defensive countermeasure, comprising:
   a bus having a termination device;
   a transceiver coupled to the bus;
   a plurality of submersible sensing channels displaced at intervals along the bus, each sensing channel coupled to the bus;
   a controller for (1) providing power to each channel, (2) controlling each channel to present a channel impedance to the bus during a time period designated for the channel, (3) sending, from the termination device, an analog pulse over the bus during the time period designated for each channel, (4) receiving a channel signal from a partial reflection of the pulse returning to the termination device during the designated time period, the amplitude of the reflected pulse representing an impedance mismatch proportional to a signal sensed by the channel; (5) combining channel signals into a packet; and (6) transmitting the packet via the transceiver to a host platform;
   a buoy for deploying the bus and enclosing the termination device, controller, and transmitter; and
   a triggering means for triggering the defensive countermeasure responsive to receiving a firing signal from the host platform.

9. The system of claim 8 wherein each channel further comprises a variable impedance element that presents channel impedance proportional to the signal sensed by the channel.

10. The system of claim 8 further comprising a plurality of buses coupled to the controller, each bus coupled to a plurality of sensing channels.

11. The system of claim 8 wherein the bus includes at least one sensing channel having a sensor type selected from the group comprising acoustic, magnetic, MEMS, seismic, e-field, environmental, and CBRNE.

12. The system of claim 11 wherein at least two sensing channels have different sensor types.

* * * * *